(12) United States Patent
Roodenburg et al.

(10) Patent No.: US 8,701,579 B2
(45) Date of Patent: Apr. 22, 2014

(54) OFFSHORE WIND TURBINE INSTALLATION

(75) Inventors: Joop Roodenburg, Delft (NL);
Diederick Bernardus Wijning,
Schiedam (NL); Alexei Bereznitski,
Delft (NL); **Theodorus Cornelis Joanes
Maria Stijnman**, Gouda (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 13/393,986

(22) PCT Filed: Aug. 23, 2010

(86) PCT No.: PCT/NL2010/050525
§ 371 (c)(1),
(2), (4) Date: May 3, 2012

(87) PCT Pub. No.: WO2011/028102
PCT Pub. Date: Mar. 10, 2011

(65) Prior Publication Data
US 2012/0266796 A1    Oct. 25, 2012

(30) Foreign Application Priority Data

Sep. 4, 2009  (NL) ..................................... 2003441

(51) Int. Cl.
*B63B 1/00*   (2006.01)
(52) U.S. Cl.
USPC ........ 114/61.14; 114/61.1; 405/204; 405/209
(58) Field of Classification Search
USPC ........................................ 114/61.1, 264, 124
See application file for complete search history.

(56) References Cited

U.S. PATENT DOCUMENTS

| 4,523,729 | A | | 6/1985 | Frick |
| 6,152,791 | A | * | 11/2000 | Sinko et al. ...................... 440/6 |
| 6,338,307 | B1 | * | 1/2002 | Pires ............................ 114/61.1 |
| 6,367,399 | B1 | * | 4/2002 | Khachaturian .............. 114/61.1 |
| 6,868,646 | B1 | * | 3/2005 | Perina ........................ 52/745.17 |
| 7,287,480 | B2 | * | 10/2007 | Lin ............................. 114/61.12 |
| 8,070,000 | B2 | * | 12/2011 | Botwright et al. ............ 212/228 |
| 2001/0003963 | A1 | * | 6/2001 | Chaix .......................... 114/124 |
| 2003/0033967 | A1 | * | 2/2003 | Hayman, III ............... 114/61.15 |

(Continued)

FOREIGN PATENT DOCUMENTS

EP         1 110 857  A2    6/2001
EP         1 304 289  A1    4/2003

(Continued)

*Primary Examiner* — Lars A Olson
*Assistant Examiner* — Jovon Hayes
(74) *Attorney, Agent, or Firm* — Birch, Stewart, Kolasch & Birch, LLP

(57) ABSTRACT

An offshore wind turbine installation vessel, wherein the wind turbine is of the type to be installed on a foundation that is installed on the seabed prior to the installation of the wind turbine on the foundation, wherein the wind turbine is of the type with a vertical mast to be fitted with its lower end onto the foundation, wherein the vessel includes a non-jack-up type floating hull; and a crane structure extending upward from said hull. The crane structure is provided with a hoisting device having one or more wind turbine suspension elements and a wind turbine engagement device supported by the suspension elements and adapted to engage with said wind turbine. The hoisting device is adapted to support and to raise and lower in controllable manner at least the mast of the wind turbine while in vertical orientation.

28 Claims, 19 Drawing Sheets

(56) References Cited

U.S. PATENT DOCUMENTS

Figures 1A, 1B:
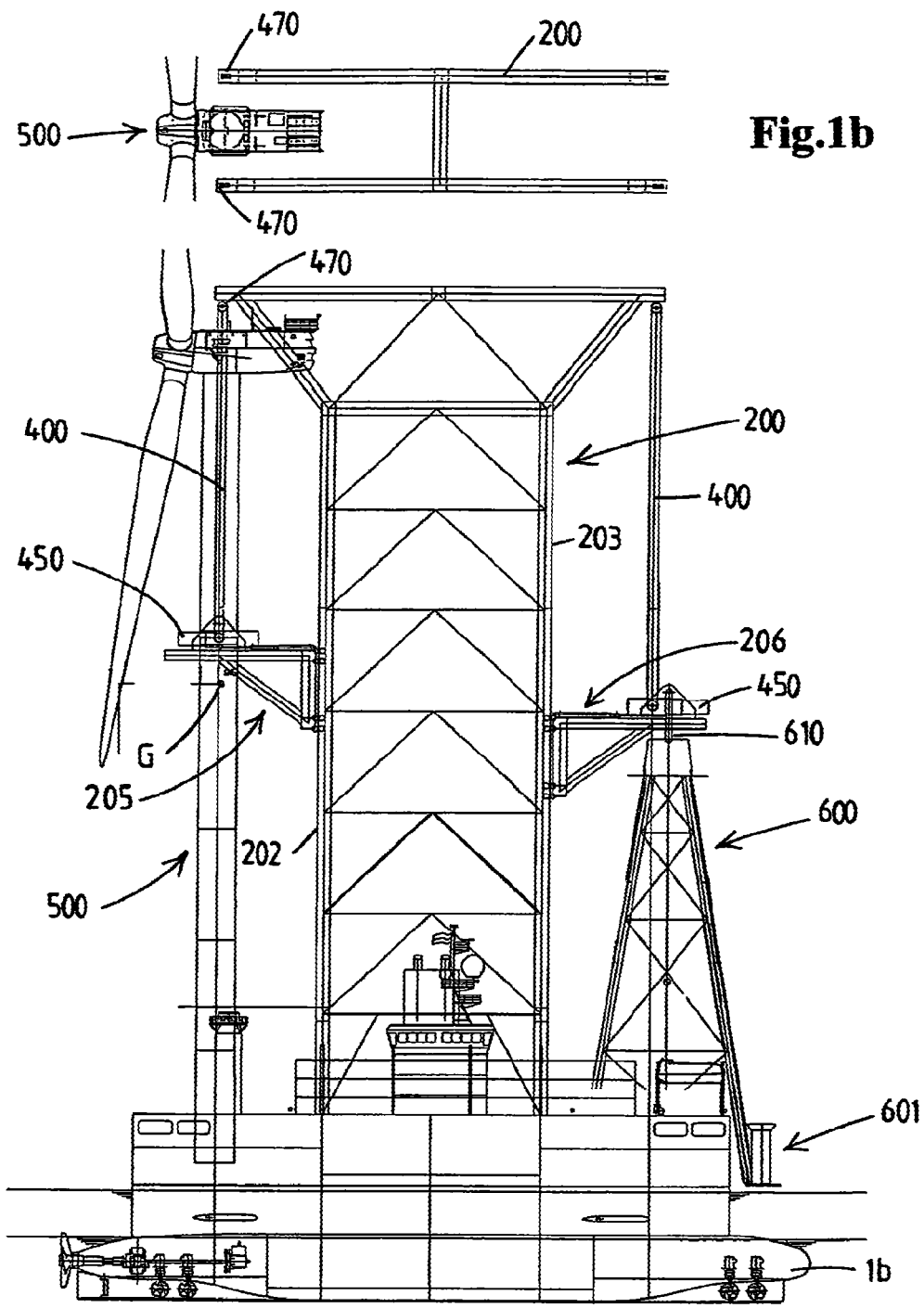

| | | | |
|---|---|---|---|
| 2003/0075093 A1* | 4/2003 | Chaix | 114/124 |
| 2007/0243063 A1* | 10/2007 | Schellstede | 416/10 |
| 2011/0139056 A1* | 6/2011 | Cholley et al. | 114/264 |

FOREIGN PATENT DOCUMENTS

| | | |
|---|---|---|
| EP | 1 321 671 A1 | 6/2003 |
| FR | 2 921 098 A1 | 3/2009 |
| GB | 1 002 788 | 8/1965 |
| GB | 2 009 705 A | 6/1979 |
| GB | 2 163 402 A | 2/1986 |
| GB | 2 336 828 A | 11/1999 |
| WO | WO 83/01059 A1 | 3/1983 |
| WO | WO 03/066427 A1 | 8/2003 |
| WO | WO 2006/076920 A1 | 7/2006 |
| WO | WO 2006/080850 A1 | 8/2006 |
| WO | WO 2007/091042 A1 | 8/2007 |
| WO | WO 2007/120039 A1 | 10/2007 |
| WO | WO 2009/036456 A2 | 3/2009 |
| WO | WO 2009/048322 A1 | 4/2009 |
| WO | WO 2009/068038 A1 | 6/2009 |
| WO | WO 2009/153530 A2 | 12/2009 |

\* cited by examiner

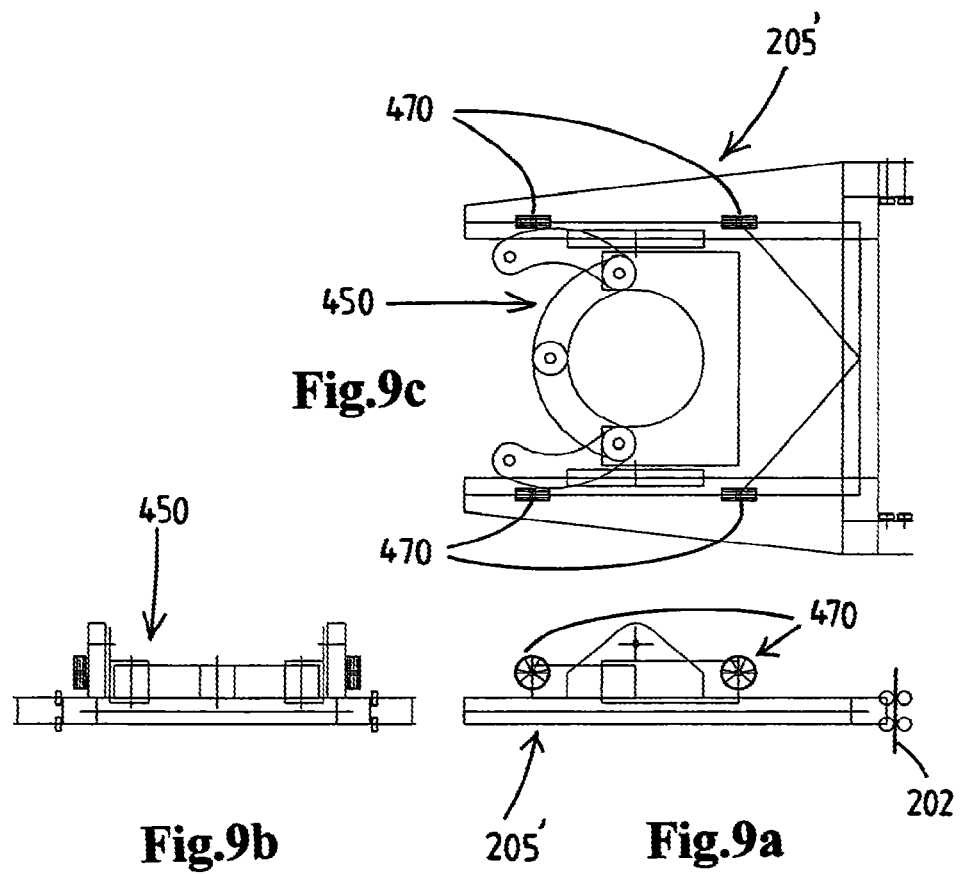

OFFSHORE WIND TURBINE INSTALLATION

The present invention relates primarily to the installation of an offshore wind turbine on an offshore location.

At present many offshore wind turbine parks are planned to allow for a significant electricity production. For reasons of efficiency the wind turbines have an ever increasing capacity and size. Nowadays 5 MW turbines are being planned, and in the future 8 MW turbines are envisaged. In known designs a 5 MW turbine has a diameter of the hub with blades of 126 meters combined with a height of the hub at about 90 meters above sea level. A proposed 8 MW turbine has a blades diameter of 160 meters combined with the hub at 120 meters above sea level.

The weight of a wind turbine including mast, nacelle and blades, at least in future designs, may well be over 1000 t. The foundation itself may well weigh several hundred tonnes, e.g. depending on the type of foundation. Many types of foundations are discussed in US2007/243063.

It has been found most cost-effective to build the entire wind turbine onshore. In particular the mounting and testing of the nacelle, hub and blades, on the mast is done onshore, which is far less costly than performing these operations offshore. This approach allows to reduce the offshore installation and commissioning to a compact operation, the installation of the complete wind turbine. In this approach the foundation may be pre-installed on the seabed and the mast with nacelle, hub and blades fastened to the foundation.

Up till now several installation vessels and methods dedicated to the installation of offshore wind turbines have been proposed.

The vessel MV Resolution is such a dedicated wind turbine installation vessel. It is a jack-up vessel with six jack-up legs that are employed to raise the hull, at least partly, above the water to stabilize the hull for installation of the wind turbine. The vessel is equipped with a main pedestal mounted boom crane at the stern of the vessel, the crane having a slewable and luffable boom. The existing MV Resolution vessel has a 300 t crane capacity, new builts of the same design are planned with a 1000 t crane capacity.

The use of the jack-up system affords a very stable platform for the crane that is generally unaffected by the sea-state, so that installation of the mast onto a pre-installed seabed foundation can be done effectively. Known foundations include structural steel frame jackets, monopiles, gravity-based foundations, etc.

The use of a jack-up vessel for wind turbine installation also comes with drawbacks, such as that wind farms are planned in water depths that are out of reach for the jack-up legs. Another drawback is that deploying/retracting the (lengthy) jack-up legs slows down the installation process.

The prior art also discloses dedicated wind turbine installation vessels that are of the non-jack-up type, so have no jack-up legs and remain in floating condition during the installation process for the wind turbine and/or foundation. An example is the Rambiz vessel, shown e.g. in WO2007/091042, wherein the crane structure allows to pick-up and transport the wind turbine in generally vertical orientation. The Rambiz is composed of two side-by-side interconnected barge-type hulls, each barge carrying a pivotal crane boom, or shear leg. A massive spreader is suspended by cables from both cranes. The mast extends through an oversized opening in the spreader, and further load carrying cables extend between the spreader and a wind turbine supporting frame fitted at the lower end of the mast. The spreader is arranged above the centre of gravity of the wind turbine.

WO2007/091042 discusses that the floating condition of the vessel during the installation onto a pre-installed foundation, entails the problem of shock loads when placing the mast onto the foundation. It is remarked therein that the mast is quite delicate, yet stiff in longitudinal direction, which would make a collision between the mast and the foundation undesirable. To avoid this problem the wind turbine supporting frame has legs with hydraulic feet. A corresponding temporary foundation frame is to be mounted on the top end of the foundation. For installation of the wind turbine the cranes lower the supporting frame and so the wind turbine. The hydraulic feet then contact the foundation frame and absorb vertical motion due to the sea-state as the turbine is lowered further down. Some sliding motion of the feet in a horizontal plane is also allowed and additional hydraulic cylinders are arranged to push the supporting frame into the correct position.

Whilst the measures proposed in WO2007/091042 may overcome some of the problems associated with installation of a wind turbine from a floating vessel, the present invention aims to provide further improvements or at least useful alternatives.

According to a first aspect of the invention an offshore wind turbine installation vessel according to claim 1 is proposed.

It is envisaged that the wind turbine engagement device is adapted to engage the mast of said wind turbine at a height above the centre of gravity of the wind turbine or that a second, additional wind turbine engagement device is provided so that the mast is engageable by said engagement assemblies at two locations spaced apart in vertical direction, e.g. spaced apart at least 20 meters.

Preferably the active horizontal motion device is adapted to perform active horizontal displacement of the one or more suspension members and/or the engagement device at least in longitudinal direction of the vessel, preferably with respect to a rigid crane structure which is rigidly connected to the hull of the vessel.

Preferably the crane structure is a rigid crane structure, e.g. a rigid structural framework, which is rigidly connected to the hull of the vessel.

In a possible embodiment the active horizontal motion device is mounted between the crane structure and the wind turbine engagement device.

In a preferred embodiment of the vessel according to claim 2, the vessel comprises a rigid crane structure extending upward from the hull, e.g. a rigid structural framework, which crane structure is rigidly connected to the hull of the vessel.

The rigid crane structure has at least a first vertical side, and said first vertical side is provided with a trolley guide. A wind turbine supporting trolley is provided which is vertically mobile along said trolley guide on the first vertical side of the crane structure. This trolley is supported by one or more suspension elements, preferably one or cables operable by one or more winches. This trolley supports the wind turbine engagement device. This trolley and the associated wind turbine engagement device are adapted to support the weight of the wind turbine.

An active horizontal motion device is mounted between this trolley and the wind turbine engagement device, which active horizontal motion device is adapted and operated to actively compensate for sea-state induced horizontal displacement of the wind turbine engagement device in at least one horizontal direction, possibly in two non-parallel horizontal directions, e.g. in orthogonal horizontal directions, while a wind turbine is supported by said wind turbine engagement device.

As is preferred operation of the active horizontal motion device is effected—with the lower end of the mast being positioned above the pre-installed foundation—at least during the steps of lowering the mast onto the foundation and fastening the mast to the foundation, so as to compensate for sea-state induced horizontal motion of the wind turbine engagement device.

The vessel allows to significantly reduce, or even eliminate, horizontal motion of the lower end of the mast relative to the pre-installed foundation. This is advantageous for one or more of the following reasons:

the operational weather window of a floating vessel can be increased allowing to install wind turbines in more adverse conditions;

taller and/or heavier wind turbines can be installed;

reduction of forces acting on the mast, foundation and any mast fasteners;

when the vessel is used for transportation of the wind turbine in vertical orientation, e.g. from an onshore location to the offshore location, operation of the active horizontal motion device is possible when desired, which allows to reduce forces on the wind turbine.

In a further preferred embodiment of the vessel, at said first vertical side of the rigid crane structure—in addition to the wind turbine supporting trolley—a second trolley is provided which is vertically mobile along a trolley guide on said first vertical side of the crane structure, wherein said second trolley supports a second wind turbine engagement device, and wherein an active horizontal motion device is mounted between the second trolley and the associated wind turbine engagement device, said active horizontal motion device being adapted to actively compensate for sea-state induced horizontal displacement of the wind turbine engagement device in at least one horizontal direction, possibly in two non-parallel horizontal directions, e.g. in orthogonal horizontal directions, wherein said crane allows to engage the mast of the wind turbine with said wind turbine engagement devices at vertically spaced apart positions so as to support the mast in vertical orientation, the one engagement device primarily supporting the weight of the wind turbine the other engagement device primarily serving to stabilize the wind turbine in its vertical orientation.

In a preferred embodiment the wind turbine supporting trolley is the lower trolley, engaging the mast at or near the lower end thereof, and the second trolley is to engage the mast at a higher location.

Preferably in the embodiment with two trolleys at said first vertical side, the crane allows to engage the mast with said wind turbine engagement devices at positions that are at least 20 meters apart in vertical direction, preferably at least 30 meters, e.g. about 40 meters.

In another embodiment it is envisaged that the mast of the wind turbine is engaged only above the centre of gravity of the wind turbine, so at a single location along its height instead of two locations that are spaced vertically apart significantly, by a wind turbine engagement device that is supported by the wind turbine supporting trolley.

It will be appreciated that additional measures are preferably taken to counteract any undesirable vertical motion during the lowering of the mast onto the foundation and the fastening of the mast to the foundation. Preferably for this purpose the wind turbine hoisting device further comprises a heave compensation device adapted to compensate for sea-state induced vertical displacement of the wind turbine engagement device. With such a vessel a method is envisaged wherein—with the lower end of the mast being positioned above the pre-installed foundation—at least during the steps of lowering the mast onto the foundation and fastening the mast to the foundation, the heave compensation device is operated to compensate for sea-state induced vertical motion of the lower end of the mast relative to the pre-installed foundation. In particular for wind turbine hoisting devices with one or more hoisting winches and cables, as is preferred here, such heave compensation devices are well known in the art, both in passive and active embodiments or hybrids thereof. E.g. the hoisting device includes one or more winches and one or more hoisting cables, the heave compensation being formed by suitable operation of the (electric) winches and/or by one or more heave compensation cylinders carrying one or more cable sheaves over which a hoisting cable is passed.

In a preferred installation method—at least during the steps of lowering the mast onto the foundation and fastening the mast to the foundation—the vessel is facing the waves with its bow or its stern, and the active horizontal motion device performs active horizontal displacement of the one or more wind turbine engagement members at least in longitudinal direction of the vessel.

Most preferably the vessel is embodied to hold the wind turbine at the bow or the stern of the vessel, preferably in the mid-plane of the vessel. Possibly the vessel is also embodied to hold not only the wind turbine but also the foundation, one of them being held at the bow of the vessel, the other at the stern of the vessel.

In a preferred embodiment the vessel has a twin hull design with two parallel hulls connected by a central bridge or cross-structure so as to form a generally H-shape deck forming open spaces between the parallel hulls towards the bow and the stern of the vessel, wherein the rigid crane structure is located above the central bridge, preferably crew accommodation being mounted on the central bridge. In this embodiment, preferably, the crane is designed to support both a wind turbine and a foundation, one of them at the open space on the bow the other at the open space at the stern.

It will be appreciated that the vessel may also have a U-shape deck forming a single open space either to the bow or the stern of the vessel, wherein the crane structure is located above the bridge between the parallel hulls of the vessel, e.g. when only the wind turbine is to be transported and/or installed with the vessel and not the foundation, or when it is envisaged that the foundation can also be held at said first side by the wind turbine hoisting device when no wind turbine is to be handled.

Preferably in a twin hull design the hulls are of the SWATH-type, which stands for Small Waterplane Area Twin Hull. This known SWATH-design minimizes hull cross section area at the sea's surface. By minimizing the ship's volume near the surface area of the sea, the vessel's stability is maximized, even in high seas and at comparatively high speeds. The bulk of the displacement necessary to keep the vessel afloat is located beneath the waves, where it is less affected by wave action. Wave excitation drops exponentially as depth increases. The SWATH-design vessel is preferably embodied such that the wind turbine is held at the bow or the stern of the vessel, with the vessel facing the waves during at least the steps of lowering and fastening the mast onto the foundation. It is envisaged that the SWATH-design results in little roll motion during sailing but also in these installation steps at zero speed, the hull mainly being subjected to heave and pitch. For this reason in a preferred embodiment the active horizontal motion device is embodied to perform active horizontal displacement in longitudinal direction of the vessel, mainly to compensate for displacement at elevated level, e.g. top end, of the crane structure caused by pitch of the vessel.

In a preferred embodiment the vessel has single rigid crane structure, the mentioned wind turbine hoisting device holding the wind turbine, at least the mast thereof, suspended along one vertical side of the crane structure, e.g. at the bow or the stern of the vessel, a foundation hoisting device also being provided that allows to support as well as raise and lower in a controllable manner the foundation for the wind turbine suspended there from along an opposed vertical side of the crane structure.

It is noted that the vessel may be used for installation procedures only, whereas the supply of wind turbines from an onshore location is done with another vessel, e.g. a barge. It is however also envisaged that the vessel described here is also used for the transportation of the wind turbine, and preferably also the foundation, from an onshore location to an offshore installation location.

As mentioned above sea-state induced vessel motions of the floating vessel, in combination with the envisaged height of the crane structure, give rise to significant horizontal motions, which can be counteracted by the active horizontal motion device. It can however also be advantageous to equip the vessel further with a roll damping device comprising one or more mobile solid ballast bodies guided on a track on the hull, preferably housed within a compartment of the hull of the vessel, e.g. within the bridge portion of a twin hull vessel, and an associated displacement drive and displacement drive control, said drive control being adapted to cause motion of said one or more solid ballast bodies so as to compensate for sea-state induced vessel roll motion. An example of such a roll damping device is described in WO2009/048322.

It is further envisage to counter pitch of the vessel by providing a pitch damping device with the same basic structure as the above-mentioned roll damping device comprising one or more mobile solid ballast bodies guided on a track and an associated displacement drive and displacement drive control, said drive control being adapted to cause motion of said one or more solid ballast bodies so as to compensate for sea-state induced vessel pitch motion. If the vessel—as preferred—is a twin hull vessel, it is preferred that a pitch damping device is associated with each parallel hull, preferably housed within a compartment of the respective parallel hull of the vessel.

In such a damping device for roll or pitch the motion of the vessel is preferably detected by one or more suitable sensors, and the a drive and control system is operable to cause and control the movements of the solid roll damping ballast in response to the detections of the one or more sensors to provide stabilization of the vessel.

As is preferred the solid ballast bodies are metal blocks. As is preferred the track is formed by one or more rails, preferably a straight section only, on which a wheeled carriage rides, which carriage supports the one or more metal blocks. This is similar to a railway carriage on rails. As is preferred the carriage is connected to a cable at either end, the cables being passed around sheaves to one or more winches, preferably electric winches, to move the carriage in reciprocal manner. Braking of the carriage may be done with the electric motor of the winch, possibly the brake energy being temporarily stored in a supercapacitor, the stored energy then being fed to the motor again when acceleration of the carriage is desired. This results in significant energy saving and less power fluctuations in the electrical system of the vessel.

If desired the vessel may also be provided with stabilizing fins and/or a water ballast system.

In a preferred embodiment the active horizontal motion device comprises one or more motor powered displacement actuator assemblies, e.g. a hydraulic power assembly including a pump and one or more hydraulic cylinders or a winch assembly with a horizontal displacement cable arrangement and with a motor powered winch.

In a possible embodiment the active horizontal motion device comprises at least one horizontal track, e.g. including one or more rails, as well as a carrier supported by said track, the carrier being provided with the engagement device, and the active horizontal motion device further includes a displacement drive and associated displacement drive control adapted to cause motion of said carrier along said track.

In a possible embodiment the active horizontal motion device comprises a first set of one or more horizontal tracks extending in a first horizontal direction, said first set supporting at least one first carrier, and said first carrier supporting a second set of one or more horizontal tracks extending in a second horizontal direction different from the first direction, e.g. the first and second direction being orthogonal directions, the second set of one or more horizontal tracks supporting one or more further second carriers supporting said engagement device.

In a preferred embodiment the suspension elements for the wind turbine support trolley are cables, e.g. combined with one or more winches, e.g. drum winches or traction winches, said cables preferably being guided over one or more lower cable sheave assemblies that support the trolley and wind turbine engagement device and preferably also over one or more top cable sheave assemblies on the crane structure.

In a possible embodiment the active horizontal motion device is mounted between the crane structure, preferably a rigid crane structure rigidly connected to the hull, and the one or more suspension elements. Preferably then each suspension element is suspended from a top suspension member of the hoisting device, and the active horizontal motion device is mounted between the crane structure, preferably rigid crane structure, and the one or more top suspension members. Preferably the one or more top suspension members are mounted on a common mobile carrier, said carrier being supported in a mobile manner with respect to the crane structure.

In a possible embodiment the active horizontal motion device comprises a horizontal displacement cable arrangement between the crane structure on the one hand and the engagement structure and/or the suspension member, possibly the top suspension member, on the other hand, and wherein the cable arrangement comprises a reference cable adapted to be attached to the seabed foundation, such that vessel motion with respect to the seabed foundation causes active horizontal motion of the engagement structure and/or the suspension member, possibly the top suspension member.

In an embodiment wherein the one or more top suspension members are mounted on a common mobile carrier, said carrier being supported in a mobile manner with respect to the crane structure, possibly the active horizontal motion device between the mobile carrier and the crane structure comprises a linkage mechanism, e.g. including pivotal bars, as well as multiple hydraulic cylinders that are adapted to provide motion of the carrier at least including a horizontal component.

In an embodiment wherein the one or more top suspension members are mounted on a common mobile carrier, said carrier being supported in a mobile manner with respect to the crane structure, possibly the active horizontal motion device comprises at least one horizontal track, as well as one or more carriers supported by said track, each carrier being provided with one or more top suspension members, and wherein the active horizontal motion device further includes a displacement drive and associated displacement drive control adapted to cause motion of said one or more carriers along said track. In this version, preferably, the active horizontal motion device comprises a first set of one or more horizontal tracks extending in a first horizontal direction, said first set supporting at least one carrier, and wherein said carrier supports a second set of one or more horizontal tracks extending in a second horizontal direction different from the first direction, e.g. the first and second direction being orthogonal directions, the second set of one or more horizontal tracks supporting one or more further carriers supporting said one or more top suspension members.

Preferably the suspension elements are cables, said cables preferably being guided over one or more lower cable sheave assemblies supporting the wind turbine engagement device or a trolley which supports the wind turbine engagement device, and preferably also over one or more top cable sheave assemblies.

Preferably the crane structure comprises a trolley which is vertically mobile along a trolley guide of the crane structure, and wherein said trolley is supported by said one or more suspension members, and wherein the trolley supports the wind turbine engagement device. Preferably the crane structure is a rigid crane structure having a vertical side along which the trolley is vertically movable. Preferably the active horizontal motion device is mounted between the trolley and the wind turbine engagement device. Preferably the trolley comprises a track in a horizontal direction, e.g. in longitudinal direction of the vessel, and wherein the wind turbine engagement device is movable along said track.

In a possible embodiment the wind turbine engagement device comprises a hang off mast clamp adapted to engage on the mast of the wind turbine, possibly above the centre of gravity of the suspended wind turbine, said hang off mast clamp being adapted to support the weight of the suspended wind turbine, e.g. the clamp frictionally engaging on the mast or, as preferred, the clamp engaging on a support formation, e.g. a collar, on the mast.

Preferably the hang off mast clamp is pivotally arranged in a carrier about at least one horizontal pivot axis, e.g. said pivot axis extending in transverse direction of the vessel.

Preferably the vessel has a twin hull design, preferably each hull being of the SWATH-type.

Preferably the vessel comprises a roll damping device comprising one or more mobile solid ballast bodies guided on a track on the hull, preferably housed within a compartment of the hull of the vessel, and an associated displacement drive and displacement drive control, said drive control being adapted to cause motion of said one or more solid ballast bodies so as to compensate for sea-state induced vessel roll motion.

Preferably the vessel comprising a pitch damping device comprising one or more mobile solid ballast bodies guided on a track on the hull, preferably housed within a compartment of the hull of the vessel, and an associated displacement drive and displacement drive control, said drive control being adapted to cause motion of said one or more solid ballast bodies so as to compensate for sea-state induced vessel pitch motion.

Preferably the vessel is also adapted to support a seabed foundation at a location remote from the location where the wind turbine is at the same time suspended from the crane structure, e.g. on a side of the crane structure opposite from the side where the wind turbine is suspended. Preferably the crane structure is provided with a second or foundation hoisting device, e.g. opposite to the mentioned wind turbine hoisting device, said second hoisting device being adapted at least for the controlled lowering of the foundation onto the seabed.

In a vessel equipped with a vertically movable trolley that supports the wind turbine engagement device at one side of the crane structure and with a second or foundation hoisting device to support a foundation at another side of the crane structure, it is preferred that a second or foundation support trolley is provided which is vertically mobile along a second trolley guide of the crane structure, e.g. opposite to the side of the wind turbine trolley, and wherein said second or foundation trolley is supported by one or more suspension members of said second or foundation hoisting device, and wherein the vessel is provided with a further suspension member for connecting the foundation to the second or foundation trolley, such that the foundation can be lifted and/or lowered by operation of the second or foundation hoisting device. The foundation support trolley may be embodied with one or more features discussed with reference to the wind turbine support trolley.

In a possible embodiment the vessel has a rigid crane structure provided on opposite vertical sides with a similar arrangement of one or more trolleys and associated hoisting devices, allowing to support two wind turbines simultaneously or one wind turbine and one foundation.

In a possible embodiment the crane structure is provided with a docking device for the wind turbine engagement device, wherein the hoisting device is operable to pull the wind turbine engagement device with the suspended wind turbine against the docking device with a pretension.

In a possible embodiment the vessel is provided with a storage for piles associated with the seabed foundation, and wherein the vessel is provided with a pile handling crane allowing to handle a pile and pile hammer.

The skilled person will appreciate that one or more of the technical features discussed here with reference to the first aspect of the invention may be incorporated in vessels discussed herein with reference to other aspects of the inventions.

The first aspect of the invention also relates to a method for installation of an offshore wind turbine, at least the mast thereof, on a pre-installed seabed foundation, wherein use is made of such a vessel.

Depending on the vessel and the operational procedures, a single the wind turbine engagement device is used to engage the mast of the wind turbine at a height above the centre of gravity of the wind turbine or a second wind turbine engagement device is used so that the mast is engaged by said engagement assemblies at two location spaced apart in vertical direction, e.g. spaced apart at least 20 meters.

The method includes—with the hull of the vessel in floating condition, and with the mast of the wind turbine engaged by a wind turbine engagement device above the centre of gravity or by two wind turbine engagement assemblies at vertically spaced apart locations—holding the wind turbine, at least the mast thereof, in vertical orientation with the hoisting device, and the further method includes positioning the lower end of the mast of the wind turbine above the pre-installed foundation, and lowering the mast onto the foundation as well as fastening the mast to the foundation, wherein the one or more active horizontal motion devices are operated to actively compensate for sea-state induced horizontal displacement of the engagement device in at least one horizontal direction, possibly in two non-parallel horizontal directions, e.g. orthogonal horizontal directions, and wherein the method further includes—with the lower end of the mast being positioned above the pre-installed foundation—at least during the steps of lowering the mast onto the foundation and fastening the mast to the foundation, operating the active horizontal motion device so as to compensate for sea-state induced horizontal motion of the wind turbine engagement device.

It is observed here that due to the enormous height of (future) masts of wind turbines, the crane structure of the vessel will need to be very tall as well. As a result sea-state induced vessel motion will cause very significant horizontal motion at the top end, or elevated positions, of the crane structure. The method allows to reduce, or possibly eliminate, the resultant horizontal motion of the mast in at least one horizontal direction, so that the wind turbine can safely and expediently be installed on the seabed foundation.

Practical embodiments of the active horizontal motion device are preferably configured to have a primary compensating effect in at least one horizontal direction. The construction of the device and integration into the vessel may however also result in some compensating effect in vertical direction.

Preferably in this method the wind turbine hoisting device further comprises a heave compensation device adapted to compensate for sea-state induced vertical displacement of the wind turbine engagement device, and wherein the method further includes—with the lower end of the mast being positioned above the pre-installed foundation—at least during the steps of lowering the mast onto the foundation and fastening the mast to the foundation, operating the heave compensation device so as to compensate for sea-state induced vertical motion of the lower end of the mast relative to the pre-installed foundation.

Preferably in this method—at least during the steps of lowering the mast onto the foundation and fastening the mast to the foundation—the vessel is facing the waves with its bow or its stern, and the active horizontal motion device performs active horizontal displacement of the one or more suspension members and/or the engagement device at least in longitudinal direction of the vessel.

Most preferably the crane structure is a rigid crane structure, e.g. a rigid structural framework, that is rigidly connected to the hull of the vessel. In view of the height of the crane structure, which may preferably be more than 75 meters above the waterline when it is desired to engage the wind turbine above or near its centre of gravity, possibly more than 100 meters, a rigid structural framework extending above the deck of the vessel as a rigid generally vertical tower is preferred.

In a possible embodiment, preferably with a rigid crane structure, the active horizontal motion device is mounted between the crane structure and the engagement device and performs active horizontal displacement of the engagement device with respect to the crane structure.

In a possible embodiment, preferably with a rigid crane structure, the active horizontal motion device is mounted between the crane structure and the one or more suspension elements and performs active horizontal displacement of said one or more suspension elements with respect to the crane structure, e.g. on one or more top suspension members—when present—from which the suspension elements are suspended.

In another possible embodiment the active horizontal motion device is mounted between the crane structure on the one hand and both the engagement device and the suspension elements on the other hand.

In a possible embodiment, yet less preferred, the crane structure is connected to the hull in a mobile manner, e.g. pivotable about a horizontal axis, e.g. transverse to the hull of the vessel, e.g. as a pivotable shearleg or A-frame. It is then envisaged as a possibility that the relevant method steps of lowering and fastening the mast are performed with the crane structure being held in a fixed orientation with respect to the hull of the vessel, the active horizontal motion device being arranged between the crane structure and the engagement device and/or the suspension elements. In a less preferred embodiment of a vessel with a crane structure arranged in mobile manner on the vessel, the active horizontal motion device is arranged between the hull and the crane structure and performs compensating motion of the crane structure with respect to the hull. As the crane structure itself is envisaged to be very tall and heavy, and is also supporting the wind turbine, it will be appreciated that this solution will be less preferred.

In a practical embodiment each wind turbine suspension element is suspended from a top suspension member of the hoisting device, and the active horizontal motion device performs horizontal compensating motion of the one or more top suspension element to compensate for sea-state induced horizontal displacement of the wind turbine engagement device, at least in one direction; preferably in longitudinal direction, possibly in two non-parallel, e.g. orthogonal directions. In a preferred execution of this method each of the top suspension members is actively moved more or less continuously during the critical phase of the installation process, such that the spatial orientation of each suspension member remains the same (at least in said one horizontal direction) independent of the sea-state (within certain limits). This can be seen as keep each suspension member in a constant orientation, e.g. vertical, with respect to the mast so that no sideways forces are exerted on the mast causing it to start moving back and forth in horizontal direction.

In a practical design two suspension elements are use in combination with a spreader supported by said suspension elements, said spreader preferably engaging in a load transferring manner on the mast above the centre or gravity, e.g. the mast being provided with load transferring members above the centre of gravity, e.g. underneath the nacelle, that cooperate with the spreader.

Most preferably the vessel used for installation of the wind turbine onto the foundation, is also adapted to support and install the foundation while holding the wind turbine, at least the mast thereof, in vertical orientation. This will allow to first lower and install the foundation on the seabed and then lower and fasten the wind turbine on the foundation using one and the same vessel.

Preferably in the method the active horizontal motion device is mounted between the crane structure and the engagement device and performs active horizontal displacement of the engagement device with respect to the crane structure.

In a possible embodiment of the method the active horizontal motion device is mounted between the crane structure and the one or more suspension elements and performs active horizontal displacement of said one or more suspension elements with respect to the crane structure. Possibly each suspension element is suspended from a top suspension member of the hoisting device, and wherein the active horizontal motion device is mounted between the crane structure and the one or more top suspension members, and wherein the active horizontal motion device performs active horizontal displacement of said one or more top suspension members with respect to the crane structure.

In a practical embodiment the active horizontal motion device comprises one or more horizontal displacement actuators mounted between the crane structure of the vessel and the one or more top suspension members and/or the wind turbine engagement device, e.g. hydraulic cylinders or assemblies of one or more cables and associated (electric) winches, or rack and pinion devices.

In a practical embodiment the one or more top suspension members are mounted on a common carrier, e.g. a rigid frame, said carrier being supported in a mobile manner with respect to the, preferably rigid, crane structure. In a possible embodiment the active horizontal motion device between the carrier and the crane structure comprises a linkage mechanism, e.g. including one or more pivotal bars, as well as multiple actuators, e.g. hydraulic cylinders that are adapted to provide motion of the rigid frame at least including a horizontal component.

In a possible embodiment of the method the crane structure is provided with a docking device for the engagement device, and wherein—for transportation of the wind turbine with the vessel—the hoisting device is operated to pull the engagement device with the suspended wind turbine against the docking device, and wherein—at least prior to the step of lowering the mast, the wind turbine is pulled against said docking device with a pretension, and wherein a down-pulling device is used to pull the lower end of the mast towards the pre-installed foundation counter to said pretension.

In a possible embodiment the crane structure is provided with a docking device for the wind turbine engagement device, and the hoisting device is operated to pull the wind turbine engagement device with the suspended wind turbine against the docking device. This is in particular advantageous when the crane structure is a rigid, non-mobile crane structure, e.g. a rigid latticework mounted on the hull of the vessel with no possibility to change the orientation of crane structure with respect to the hull. The docking then effectively causes the wind turbine to become fixed to the crane structure and thus the hull of the vessel, at least at the height of the docking device. The method then envisages that the installation onto the pre-installed foundation is done with use of a further down-pulling device that is operated to pull the lower end of the mast towards the pre-installed foundation counter to said pretension. The pretension can be provided with use of a heave compensation device acting on a cable of the hoisting device.

In a preferred embodiment of the method, the method includes suspending from the crane structure the entire wind turbine with the nacelle on top of the mast and preferably also with the hub and the blades fitted.

In a very preferred embodiment the vessel is also adapted to support a seabed foundation at a location remote from the location where the wind turbine is at the same time suspended from the crane structure, e.g. on a side of the crane structure opposite from the side where the wind turbine is suspended. In a possible embodiment the crane structure, rigid of structure and rigidly fixed on the hull of the vessel, is provided with a foundation hoisting device, e.g. opposite to the mentioned wind turbine hoisting device, said foundation hoisting device being adapted at least for the controlled lowering of the foundation onto the seabed.

In a preferred embodiment of the method, the vessel is also adapted to support and install the foundation while holding the wind turbine, at least the mast thereof, in vertical orientation, wherein the method involves lowering and installing the foundation on the seabed and then lowering and fastening the wind turbine on the foundation.

In a possible embodiment of the method the vessel has a single rigid crane structure, the mentioned hoisting device holding the wind turbine, at least the mast thereof, along one vertical side of the crane structure, a foundation hoisting device also being provided that allows to support as well as raise and lower in a controllable manner the foundation suspended there from along an opposed vertical side of the crane structure.

Preferably the method includes the use of the vessel for transportation of the wind turbine, and preferably also the foundation, from an onshore location to an offshore installation location.

A second aspect of the invention relates to an offshore wind turbine installation vessel as in claim 16 for installation of an offshore wind turbine, wherein the wind turbine is of the type to be installed on a foundation that is installed on the seabed prior to the installation of the wind turbine on the foundation, wherein the wind turbine is of the type with a vertical mast to be fitted with its lower end onto the foundation, and with a nacelle with a hub and blades supported on top of said mast, wherein said vessel comprises:

a hull; preferably a non-jack-up type floating hull; preferably a self-propelled floating hull;

a crane structure extending upward from said hull;

wherein the crane structure is provided with a wind turbine hoisting device having one or more wind turbine suspension elements and a wind turbine engagement device supported by said one or more suspension elements and adapted to engage with said wind turbine, said hoisting device being adapted to support and to raise and lower in controllable manner at least the mast of the wind turbine while in vertical orientation; preferably with the nacelle and preferably also with the hub and blades fitted on top of the mast;

wherein the vessel has rigid crane structure that is rigidly fixed on the hull of the vessel, the wind turbine hoisting device being arranged to hold the wind turbine, at least the mast thereof, along a first vertical side of the crane structure, a foundation hoisting device also being provided that allows to support as well as raise and lower in a controllable manner the foundation suspended there from along an opposed second vertical side of the crane structure.

Preferably the vessel is a twin hull vessel, preferably of the SWATH-design, with two parallel hulls connected by a central bridge so as to form a generally H-shape deck forming open spaces between the hulls towards the bow and the stern of the vessel, wherein the rigid crane structure is located above the central bridge, preferably crew accommodation being mounted on the central bridge.

It will be appreciated that the vessel according to the second aspect of the invention can be embodied with one or more of the technical or operational features discussed with reference to the first aspect of the invention.

A third aspect of the invention relates to a twin hull offshore vessel, said offshore vessel having two parallel buoyant hulls interconnected by a hull cross-structure above the waterline. Such vessels are known in the art.

In this third aspect the hulls may be designed according to the SWATH-type as is preferred. Even though a vessel with such hulls is less susceptible to sea motion than e.g. a monohull vessel or common semi-submersible vessel, it is desirable to increase the stability. In particular it is desirable to enhance stability of the vessel when it is at a standstill, e.g. when the vessel is moored or held by a DP system at a location on sea.

According to the third aspect of the invention, the twin hull offshore vessel further comprises a roll damping device comprises one or more mobile solid ballast bodies guided on a track, preferably housed within a compartment of the hull cross-structure of the vessel, and an associated displacement drive and displacement drive control, said drive control being adapted to cause motion of said one or more solid ballast bodies so as to compensate for sea-state induced vessel roll motion, and the vessel further comprises at least one pitch damping device comprising one or more mobile solid ballast bodies guided on a track and an associated displacement drive and displacement drive control, said drive control being adapted to cause motion of said one or more solid ballast bodies so as to compensate for sea-state induced vessel pitch motion, preferably a pitch damping device being associated with each buoyant hull, preferably housed within a compartment of the respective buoyant hull of the vessel.

By arranging a pitch damping device in each hull of the vessel optimal use is made of available space and optimal damping is obtained.

It will be appreciated that the damping devices are preferably construed as discussed herein above.

Preferably in said roll damping device the one or more solid ballast bodies are displaceable in transverse direction of the hull over at least 10 meters.

Preferably in each pitch damping device the one or more mobile solid ballast bodies are displaceable in longitudinal direction of the hull over at least 20 meters, preferably between 40 and 80 meters.

Preferably each parallel hull is of the SWATH-type having a submarine form lower hull portion and one or more streamlined struts on top of said hull portion, said one or more struts extending through the water surface, the upper ends of the one or more struts connecting to the cross-structure.

In this third aspect of the invention preferably the crane has a rigid crane structure erected on said cross-structure of the vessel, preferably the crane being embodied with a rigid crane structure rigidly mounted on the hull of the vessel, e.g. according to one or more of claims 1-11 when use as wind turbine installation vessel is envisaged.

It will be appreciated that the measures of the third aspect of the invention may also be included in a vessel according to the second aspect of the invention.

The vessel according to the third aspect of the invention can be embodied as crane vessel, e.g. an offshore installation crane vessel for wind turbines or other objects to be placed by one or more cranes of the vessel on a seabed foundation, e.g. a topside of a oil/gas platform, and/or—when the vessel has a crane for subsea, e.g. deepwater, installation—for subsea installation of objects on the seabed, e.g. templates. The vessel could also be embodied as a drilling vessel having one or more drilling station for offshore drilling operations. The vessel could also be embodied as a subsea pipelaying vessel.

A fourth aspect of the invention relates to a twin hull crane vessel having two parallel buoyant hulls interconnected by a load-bearing cross-structure above the waterline, wherein said hull cross-structure supports a crane, wherein the crane has a vertically extending rigid structural framework that is erected on said vessel, and wherein said framework of the crane is embodied to form a load-bearing structure absorbing sea-state induced forces complementary to the cross-structure of the vessel.

In general catamaran vessels are, due to their basic design, subject to a range of forces under influence of the sea-state. For instance a transverse vertical bending moment in cross-structure, a torsional moment in cross-structure, a vertical shear force acting on the cross-structure, as well as in-plane horizontal forces on the cross-structure.

By suitable design the rigid structural framework of the crane can provide strength complementary to the strength of the cross-structure. This e.g. allows the cross-structure to be embodied as a relatively thin deck-box structure on top of which a crew accommodation and bridge of the vessel can be arranged, generally within the structural framework of the crane.

In a practical embodiment the rigid structural framework of the crane comprises two parallel rows of multiple vertical posts arranged on the cross-structure, each row being spaced from the outer side of the adjacent hull, horizontal girders between the posts in axial and transversal direction, one or more diagonal braces in vertical planes between the posts, and one or more diagonal braces between each hull and one or more of the posts. Preferably the latter diagonal braces, each extend from a lower end thereof near the outermost side of the respective hull upwardly inclined towards a vertical post, said post being arranged near or at the inner most side of the respective hull. These diagonal braces provide significant additional strength to the vessel.

It will be appreciated that the fourth aspect of the invention can be included in a vessel according to the first and/or second and/or third aspect of the invention.

A fifth aspect of the invention relates to a wind turbine installation tool according to claim 25. This tool is envisaged to temporarily hold the mast on the foundation while the permanent connection between the mast and the foundation is made, e.g. when the set of connector bolts is fitted. In practice the provision of such a set of bolts is time-consuming. In this respect it would be undesirable to have to keep a wind turbine installation at the site to hold the wind turbine during said process. With the use of the tool, once the tool has engaged on the mast, the mast can be released from the vessel, and the vessel can e.g. sail back to the onshore site to pick up a new wind turbine and/or foundation. This greatly improves the operational efficiency of the vessel, preferably a vessel as discussed herein.

In this fifth aspect of the invention the tool is adapted to allow for rotation of the mast about its longitudinal axis while the mast is held on the foundation by the tool. This allows to rotate to mast with respect to the foundation in view of the installation thereon, e.g. in view of aligning bolt holes.

As is preferred the tool comprises a set of lower rollers engaging the flange of the mast from below and a set of upper rollers engaging said the flange from above.

Preferably each upper roller is displaceable between a retracted position and an active position engaging on the flange, and wherein one or more actuators, e.g. hydraulic jacks, are associated with the upper rollers so that said flange can be forcibly clamped between the lower and upper rollers.

Preferably the tool further comprises side rollers adapted to engaging on the side of said flange.

It will be appreciated that the structure of the tool of the fifth aspect of the invention could be included in a wind turbine engagement device of an installation vessel, e.g. as discussed with reference to any of the other aspects of the invention.

In a sixth aspect of the invention an offshore wind turbine installation vessel for installation of an offshore wind turbine is provided, wherein the wind turbine is of the type to be installed on a foundation that is installed on the seabed prior to the installation of the wind turbine on the foundation, wherein the wind turbine is of the type with a vertical mast to be fitted with its lower end onto the foundation, and with a nacelle with a hub and blades supported on top of said mast, wherein said vessel comprises:

a hull; preferably a non-jack-up type floating hull; preferably a self-propelled floating hull;

a crane structure extending upward from said hull;

wherein the crane structure is provided with a wind turbine hoisting device having one or more wind turbine suspension elements and a wind turbine engagement device supported by said one or more suspension elements and adapted to engage with said wind turbine at a height above its centre of gravity, said hoisting device being adapted to support and to raise and lower in controllable manner at least the mast of the wind turbine while suspended in vertical orientation; preferably with the nacelle and preferably also with the hub and blades fitted on top of the mast;

wherein the crane structure is provided with a docking device for the wind turbine engagement device, and wherein the hoisting device is operable to pull the wind turbine engagement device with the suspended wind turbine against the docking device with a pretension.

A seventh aspect of the invention relates to method for installation of an offshore wind turbine foundation having multiple pile guides, possibly a wind turbine being pre-assembled on the foundation, wherein the foundation is placed on the seabed and a pile is driven through each of the pile guides into the seabed, in which method use is made of a vessel for transportation of the vessel and installation of the foundation on the seabed, the vessel being provided with a hoisting device adapted to support and controllably lower the foundation onto the seabed, and wherein the vessel is provided with multiple positioning pins that are each received in a pile guide to maintain the foundation in a predetermined position during transportation of the foundation with the vessel.

It will be appreciated that any of the further aspects of the invention can be readily combined with the seventh aspect of the invention.

In an eight aspect of the invention, not shown in the drawings, the vessel according to one or more of the other aspects of the invention may be provided with a jack-up system including multiple individually operable jack-up legs that are vertically movable with respect to the vessel. A jack-up mechanism is associated with each leg. In operation the legs are lowered down onto the seabed and the jack-up mechanisms then allow to elevate the vessel, partly or completely out of the water.

Partly elevating the vessel our of the water allows to create a downward load on the legs such that the leg ends are maintained in contact with the seabed independent of lifting forces on the vessel resulting from passing waves. This may be envisaged when the vessel is employed in relatively shallow water, e.g. when installing wind turbines on a sand bank. As noted before, such operation is considered time consuming and therefore less desirable, yet in shallow water or under circumstances it may be advantageous to have available the possibility of a jack-up system.

It is noted that when the vessel is a twin hull vessel of the SWATH-design, these lifting forces are limited due to the reduced surface of the hull structure that passes through the water surface in this type of vessel. Therefore the combination with a jack-up system may well be favorable.

It is envisaged that when the vessel is provided with a jack-up system that the jack-up legs are embodied as removable from the vessel, so that the vessel is used with the jack-up legs removed when their use is not contemplated, e.g. as the water is too deep.

In a twin hull vessel it is a preferred embodiment that for each leg a vertical passage is made through the respective buoyant hull part of the vessel, preferably between the bottom of each of the hull part, through the reduced surface section strut on top of each of said hull parts, and up through the deck structure of the vessel, so allowing a maximum height of the passage through the hull. Preferably the hull includes leg supporting structural elements, e.g. at the lower end and the upper end of the passage, the maximized distance between them affording an optimal absorption of bending moments.

Preferably the jack-up mechanisms are housed in the hull of the vessel, below the upper deck in which the upper opening of the passage is formed through which the leg will extent, so that minimal deck space is occupied by the jack-up system. In prior art designs jack-up mechanisms are placed or at least extend above said deck and thus form an obstacle. With the leg removed from the passage, e.g. when not needed, it is proposed that a cover is provided to close at least the upper end of the passage for the leg, preferably flush with the surrounding deck so that no obstacle is formed and deck space is usable in a safe manner. If desired a cover is provided to seal the lower opening of the passage for the leg, when the leg has been removed.

A ninth aspect of the invention relates to a vessel having a pair of substantially parallel, laterally spaced hull parts, a vertical structure supported by and extending upwardly from each of said hull parts, a deck structure supported by the upper ends of said vertical structures, wherein the vessel is provided with a jack-up system including multiple individually operable jack-up legs adapted to individually be rested on the seabed with its lower end, at least two legs being provided at each hull part of the vessel, which legs are vertically movable with respect to the vessel, the vessel further including a jack-up mechanism associated with each jack-up leg.

It is envisaged that the vessel according to the ninth aspect of the invention can be of the type known as semi-submersible floating vessel with a pair of substantially parallel, laterally spaced buoyant pontoons, e.g. with ballast chambers to permit said pontoons to be moved between a submerged condition and a surface floating condition, and with a row of multiple columns supported by and extending upwardly from each pontoon, and a deck structure supported by the upper ends of said columns.

In a generally known design the columns of a semi-submersible are dimensioned such as to contribute substantially to the buoyant capacity of the vessel, and their cross-section that extends through the water surface is far greater than in the SWATH-design. Often the columns are of cylindrical, square or rectangular cross-section in a semi-submersible vessel. In a SWATH-vessel—when seen in longitudinal direction—a slender, elongated vertical water surface piercing structure is generally present, preferably with a low water resistance shaped cross-section. In the SWATH-vessel shown here in the drawings a single vertical water surface piercing vertical hull structure is present for each hull part, but multiple vertical structures are also possible.

In a preferred embodiment of a semi-submersible, as discussed with reference to the wind turbine installation vessel, for each jack-up leg a vertical passage is made through the each laterally spaced buoyant pontoon of the vessel, and then preferably upwards through a column (thus shielded) and then preferably upwards also through the deck structure. Preferably the associated jack-up mechanism is housed within the vessel, e.g. in a column of the vessel.

It is envisaged, preferably with a SWATH type vessel, that the jack-up procedure is carried out such that a portion of the hull parts remain submerged during the use of the vessel, so that a substantial buoyancy is still provided by the hull parts and the jack-up legs primarily serve to stabilize the vessel.

A semi-submersible vessel may include a brace structure of one or more braces between the columns and/or between a column and the deck structure for stability.

It will be appreciated that such a semi-submersible vessel may be designed and used for other activities then wind turbine installation, e.g. as a general purpose crane vessel, a drilling vessel, etc. However it is also envisaged that such a vessel is indeed designed as a dedicated wind turbine installation vessel, e.g. fitted with one or more of the: crane structure, active horizontal motion device, H-shaped deck, as disclosed herein.

A tenth aspect of the invention relates to an offshore wind turbine installation vessel for installation of an offshore wind turbine, wherein the wind turbine is of the type to be installed on a foundation that is installed on the seabed prior to the installation of the wind turbine on the foundation, wherein the wind turbine is of the type with a vertical mast to be fitted with its lower end onto the foundation, and with a nacelle with a hub and blades supported on top of said mast, wherein said vessel comprises:

a hull; preferably a non-jack-up type floating hull; preferably a self-propelled floating hull;

a crane structure extending upward from said hull;

wherein the crane structure is provided with a hoisting device having one or more wind turbine suspension elements and a wind turbine engagement device supported by said one or more suspension elements and adapted to engage with said wind turbine at a height above its centre of gravity, said hoisting device being adapted to support and to raise and lower in controllable manner at least the mast of the wind turbine while suspended in vertical orientation; preferably with the nacelle and preferably also with the hub and blades fitted on top of the mast;

wherein the crane structure is provided with a docking device for the wind turbine engagement device, and wherein the hoisting device is operable to pull the wind turbine engagement device with the suspended wind turbine against the docking device with a pretension.

An eleventh aspect of the invention relates to a method for installation of an offshore wind turbine foundation having multiple pile guides, possibly a wind turbine being pre-assembled on the foundation, wherein the foundation is placed on the seabed and a pile is driven through each of the pile guides into the seabed, in which method use is made of a vessel for transportation of the vessel and installation of the foundation on the seabed, the vessel being provided with a hoisting device adapted to support and controllably lower the foundation onto the seabed, and wherein the vessel is provided with multiple positioning pins that are each received in a pile guide to maintain the foundation in a predetermined position during transportation of the foundation with the vessel.

A twelfth aspect of the invention relates to a method for installing a wind turbine on a foundation previously installed on the seabed, wherein use is made of a vessel having a damping device for damping roll and/or pitch of the vessel while the installation takes place, wherein said damping device includes a control unit that measures the relevant ship motion or motions with respect to the foundation on which the wind turbine is to be installed and/or with respect to one or more other foundations or wind turbines that have already been installed in the same field of offshore wind turbines. Preferably the vessel is a vessel according to one or more of the other aspects of this invention. Most preferably the vessel comprises a rigid crane structure rigidly mounted on the hull of the vessel, wherein the measurement is made for an elevated position in the rigid crane structure.

The skilled person will appreciate that features discussed with reference to one aspect of the invention may be readily combined with one or more other aspects of the invention, as will also follow from the embodiment shown in the drawings.

The aspects of the invention will now be discussed with reference to the appended drawings.

Figure 2:
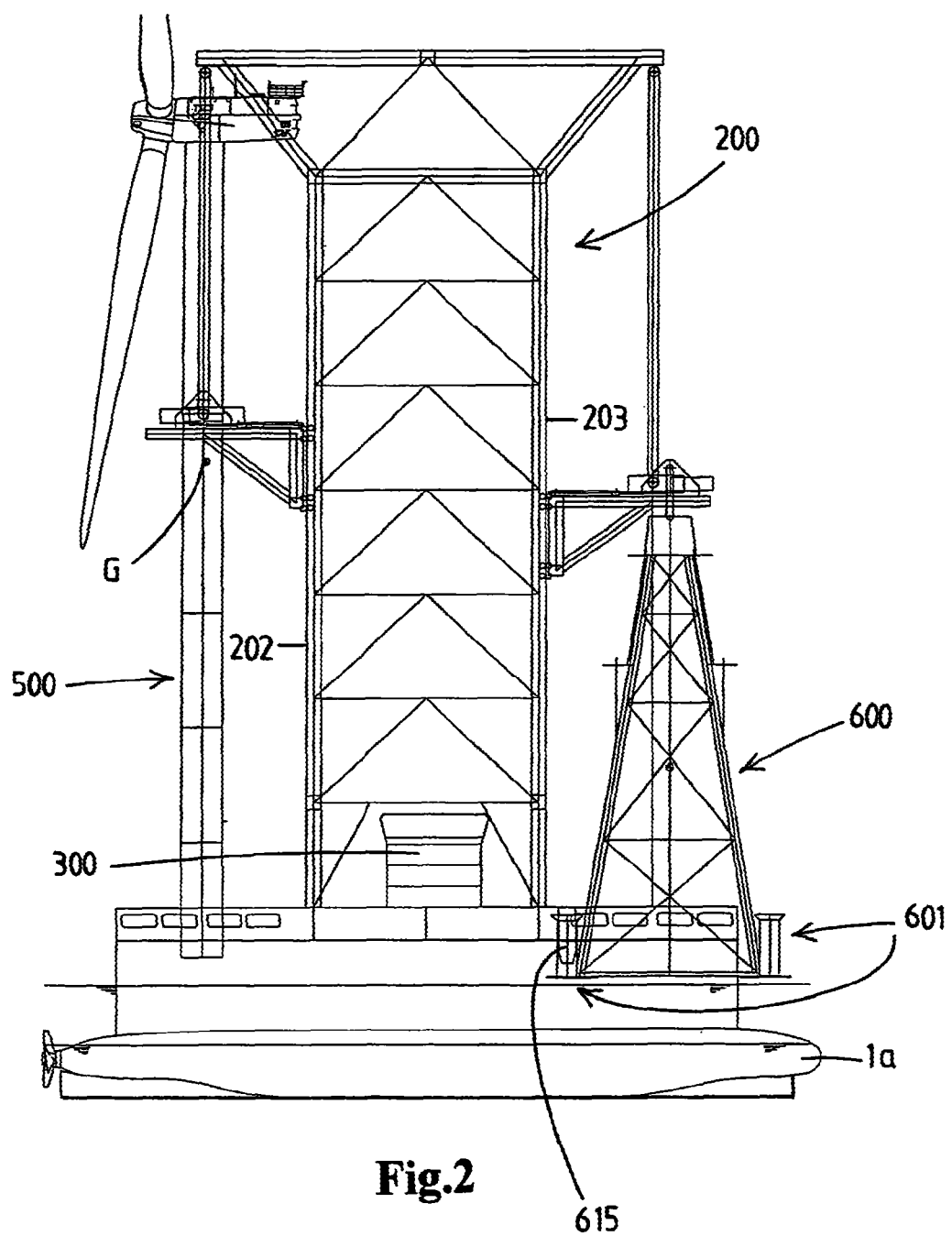
Figure 3:
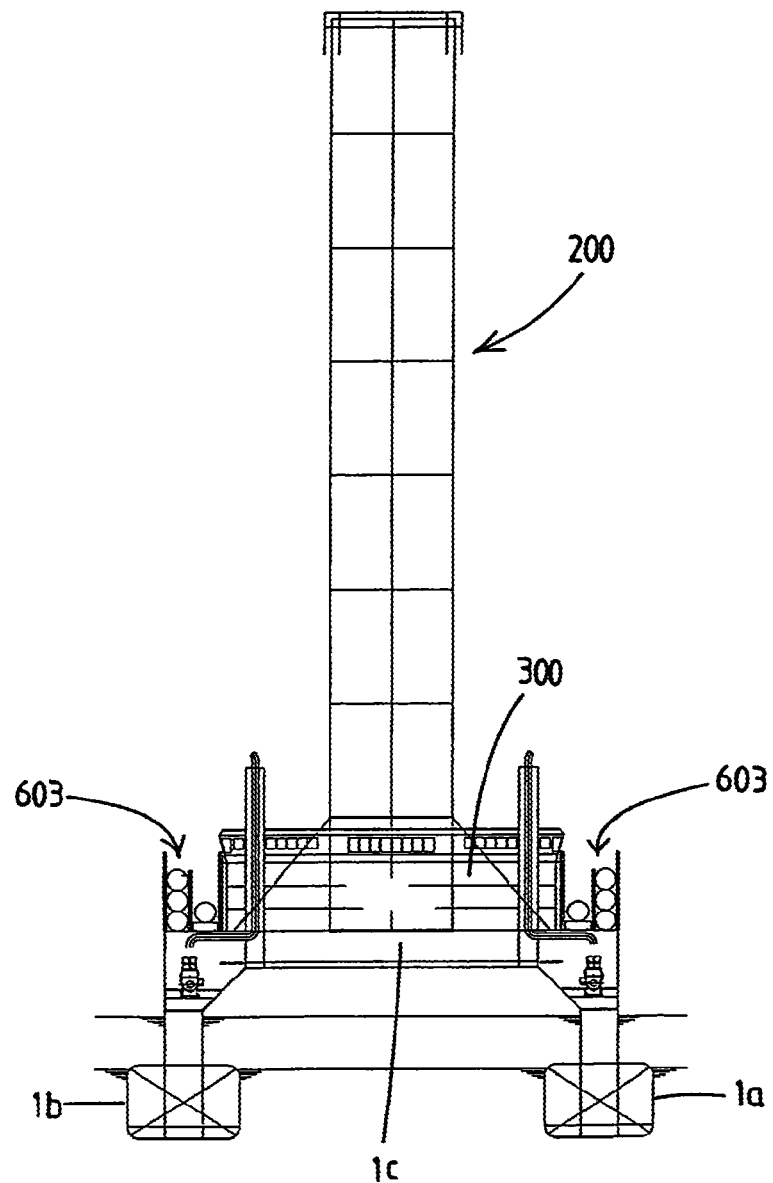
Figure 4:
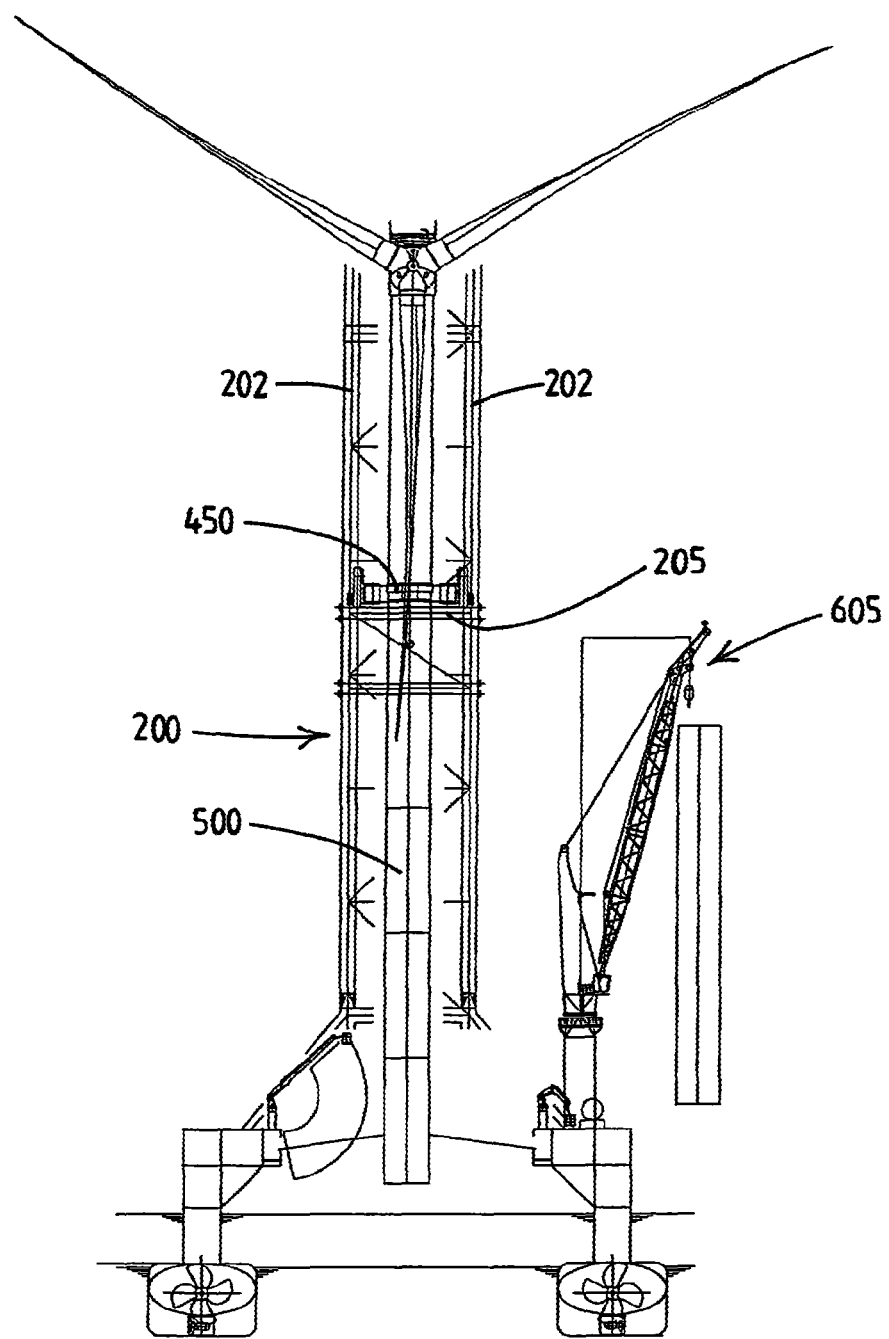
Figure 5:
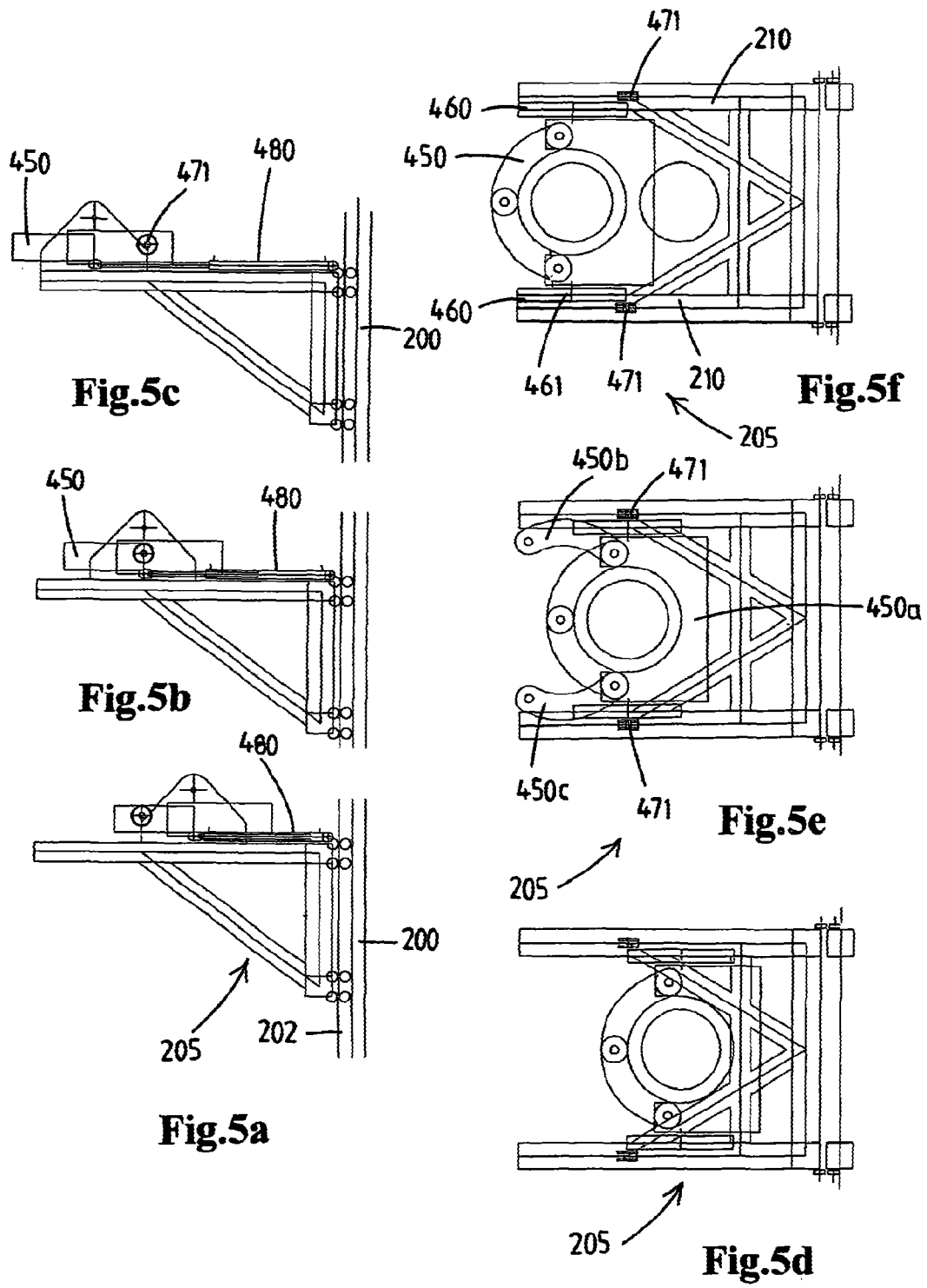
Figure 6:
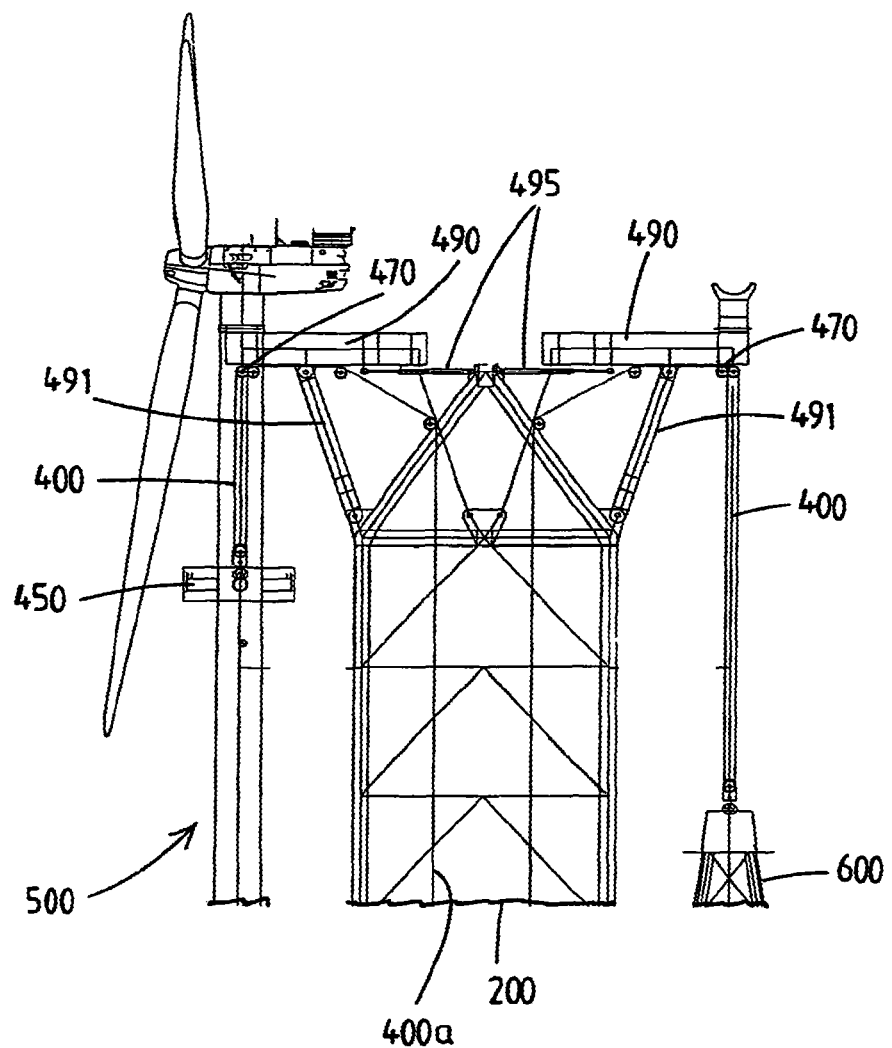
Figures 7A, 7B:
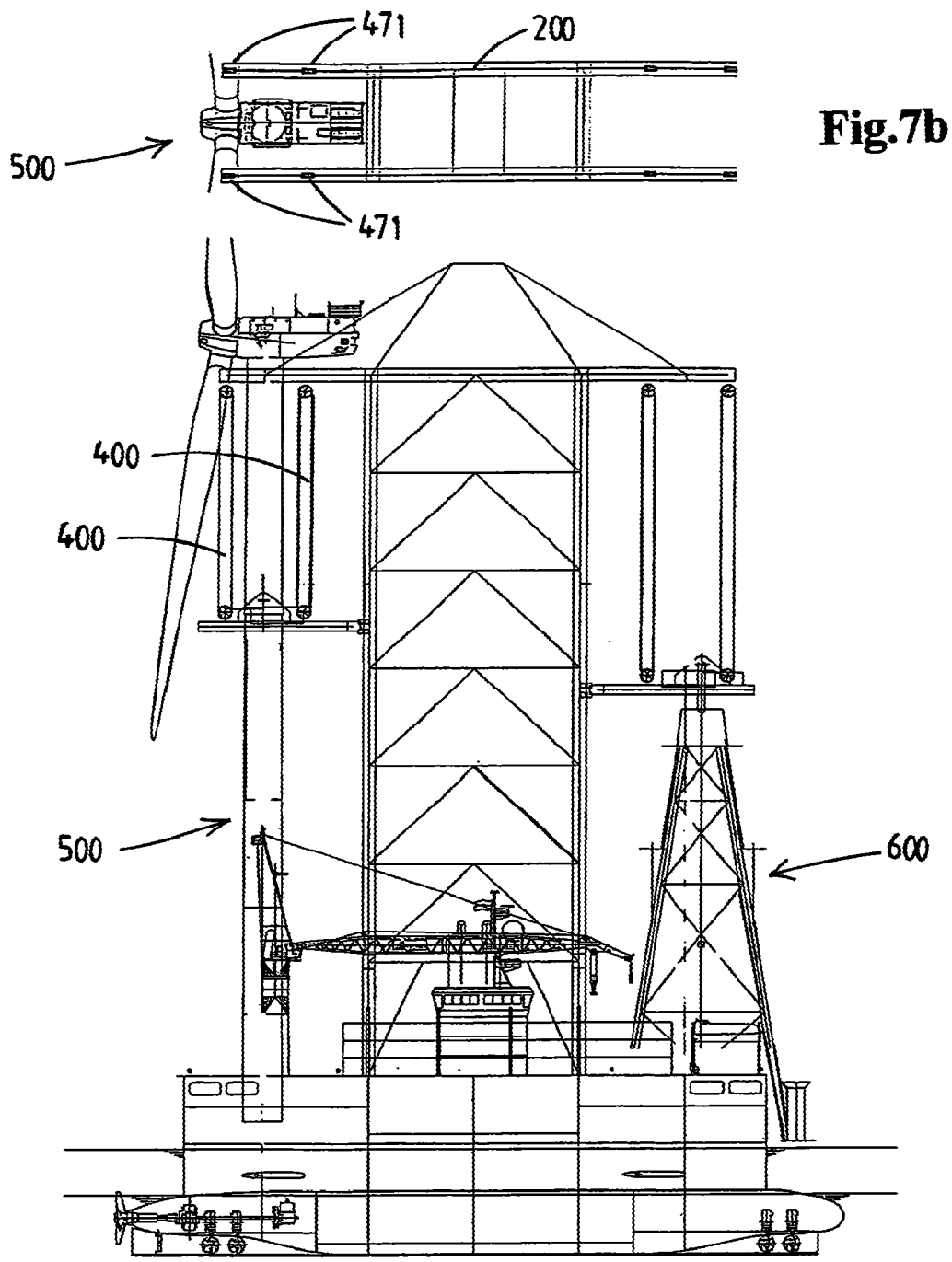

In the drawings:

FIG. 1a shows a preferred embodiment of a vessel according to the invention in side view, FIG. 1b shows a top view of the crane structure of the vessel of FIG. 1a, FIG. 2 shows the vessel of FIG. 1a in longitudinal section, FIG. 3 shows the vessel of FIG. 1a in transversal section, FIG. 4 shows the vessel of FIG. 1a in view from the stern, FIGS. 5a-c show the trolley of the vessel of FIG. 1a in side view with different position of the wind turbine engagement device, FIGS. 5d-f show the trolley of FIGS. 5a-c from above, FIG. 6 shows the upper portion of the crane structure with an alternative active horizontal motion device, FIG. 7a shows another preferred embodiment of a vessel according to the invention in side view, FIG. 7b shows a top view of the crane structure of the vessel of FIG. 7a, FIGS. 8a-c shows the vessel of FIG. 7a with a wind turbine suspended above a pre-installed foundation in different sea-state induced positions, FIGS. 9a-c shows in different views the trolley and mast clamp of the vessel of FIG. 7a.

Figure 10:
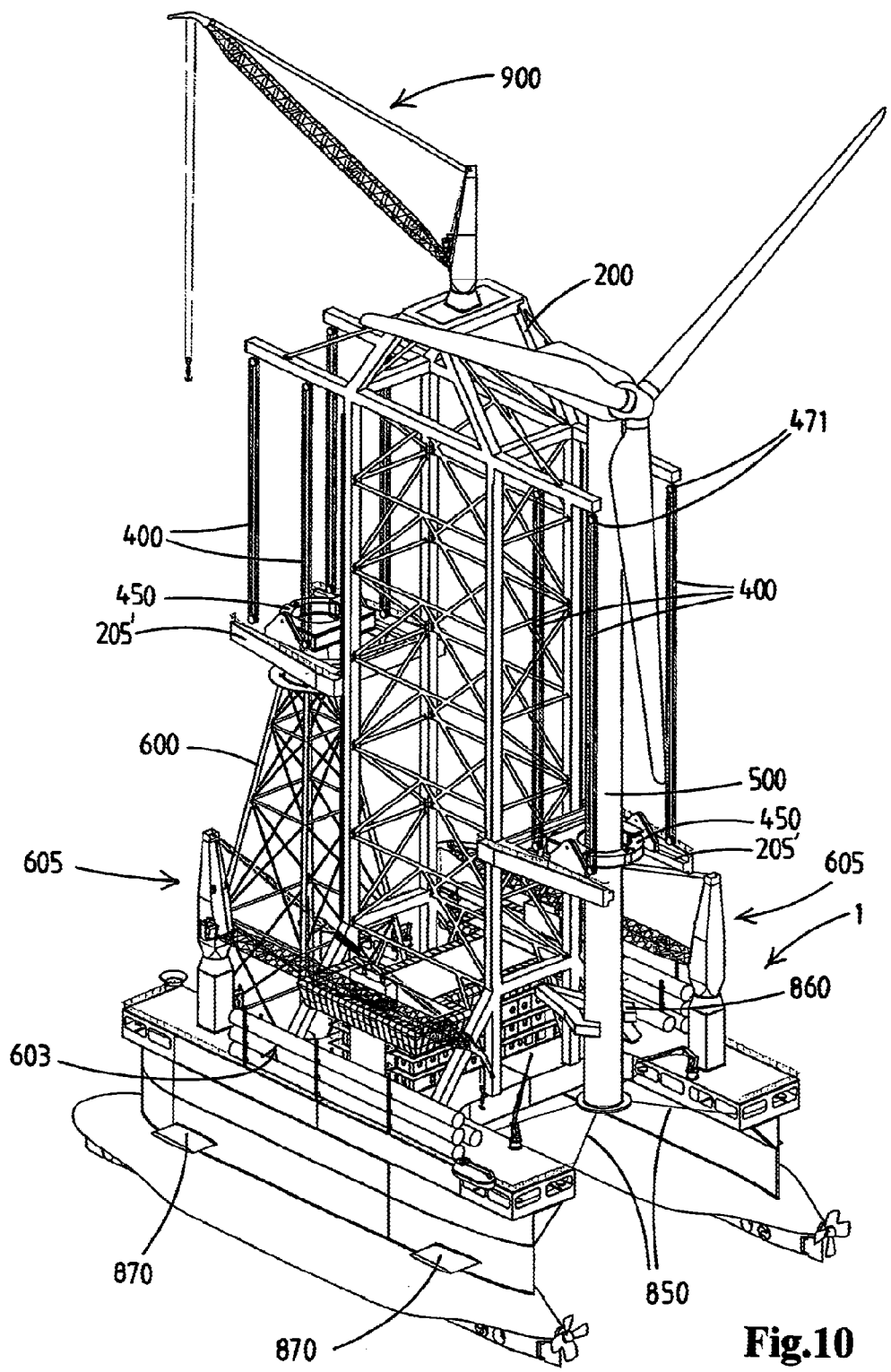

FIG. 10 shows in perspective view of an offshore wind turbine installation vessel.

Figure 11:
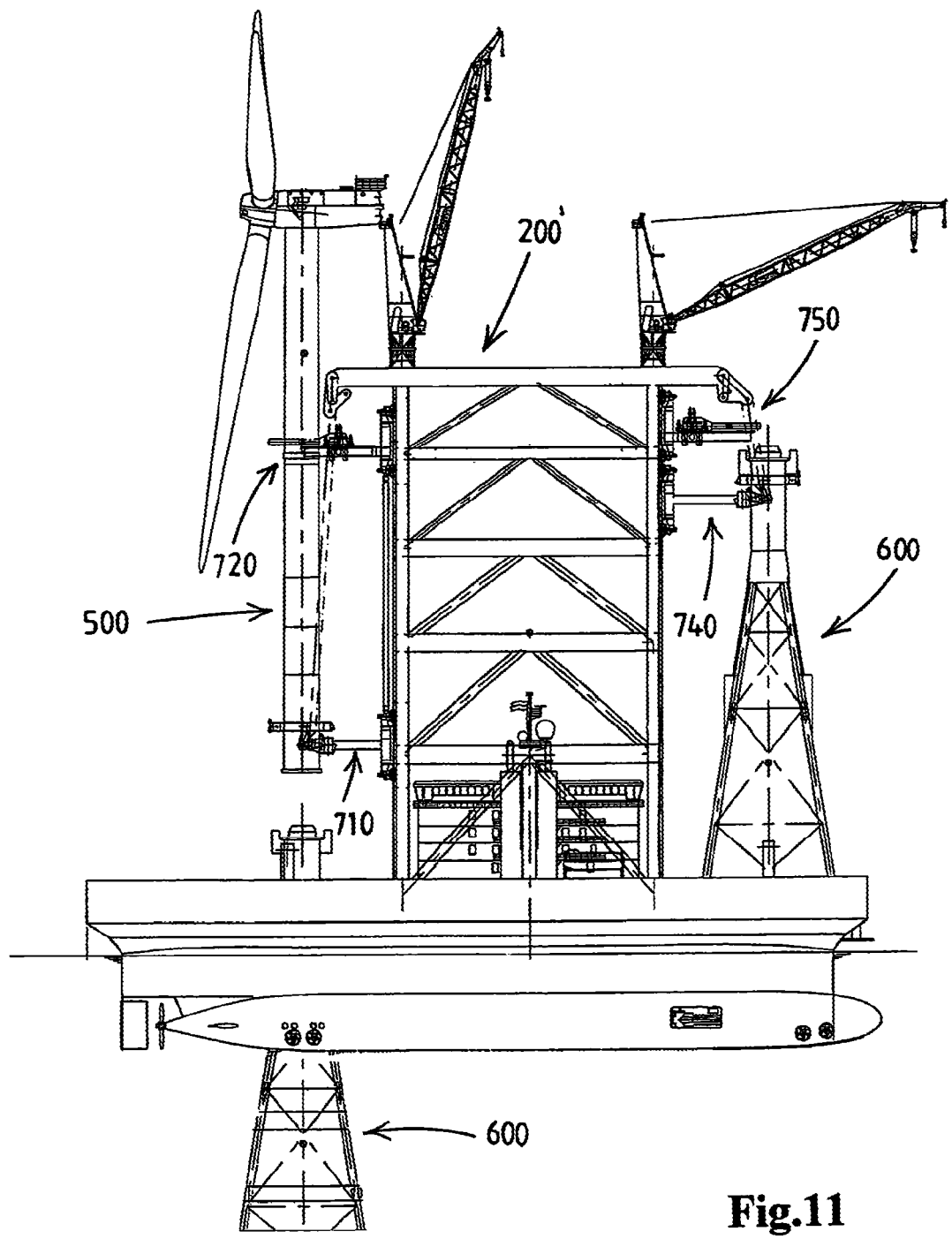
Figure 12A:
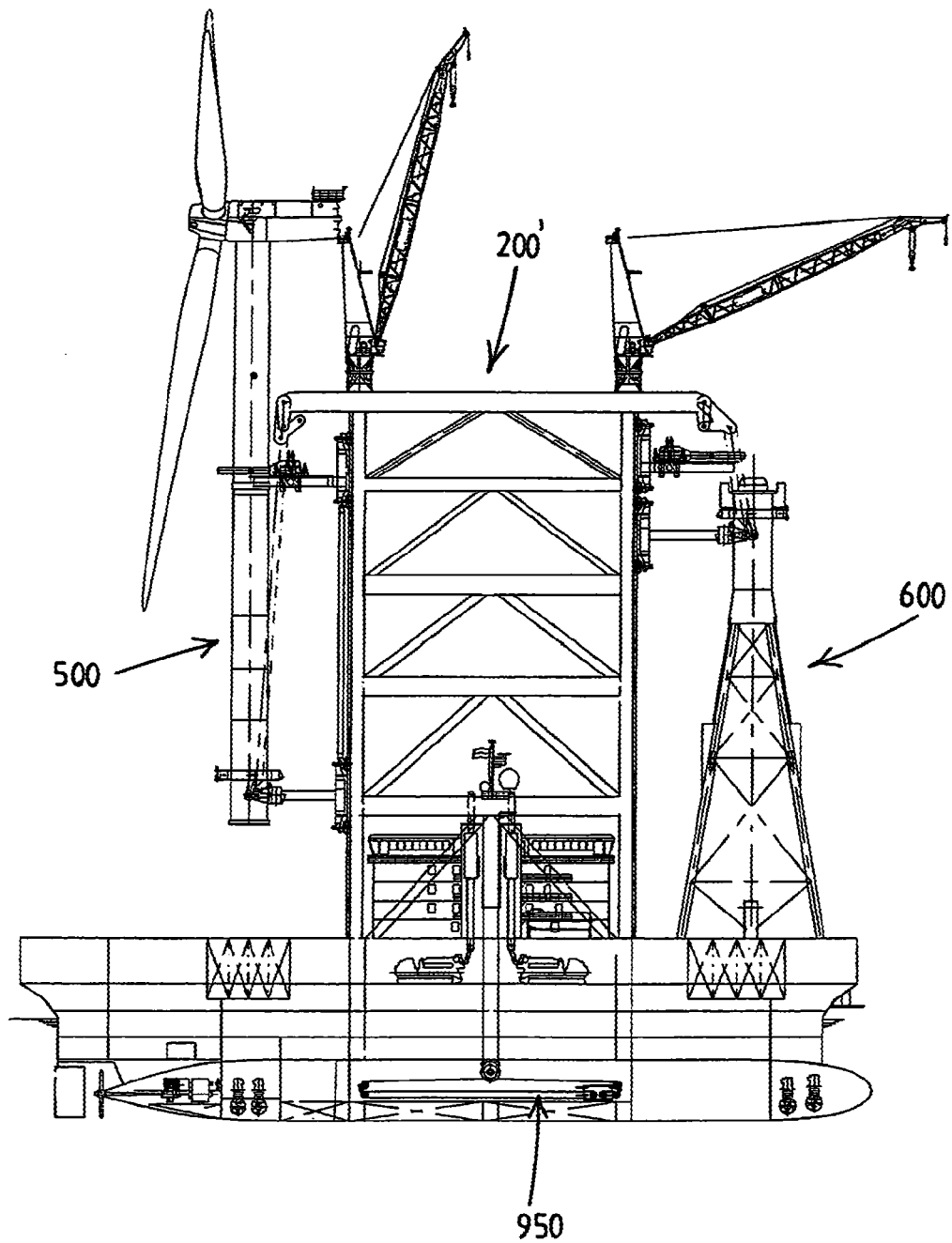
Figure 12B:
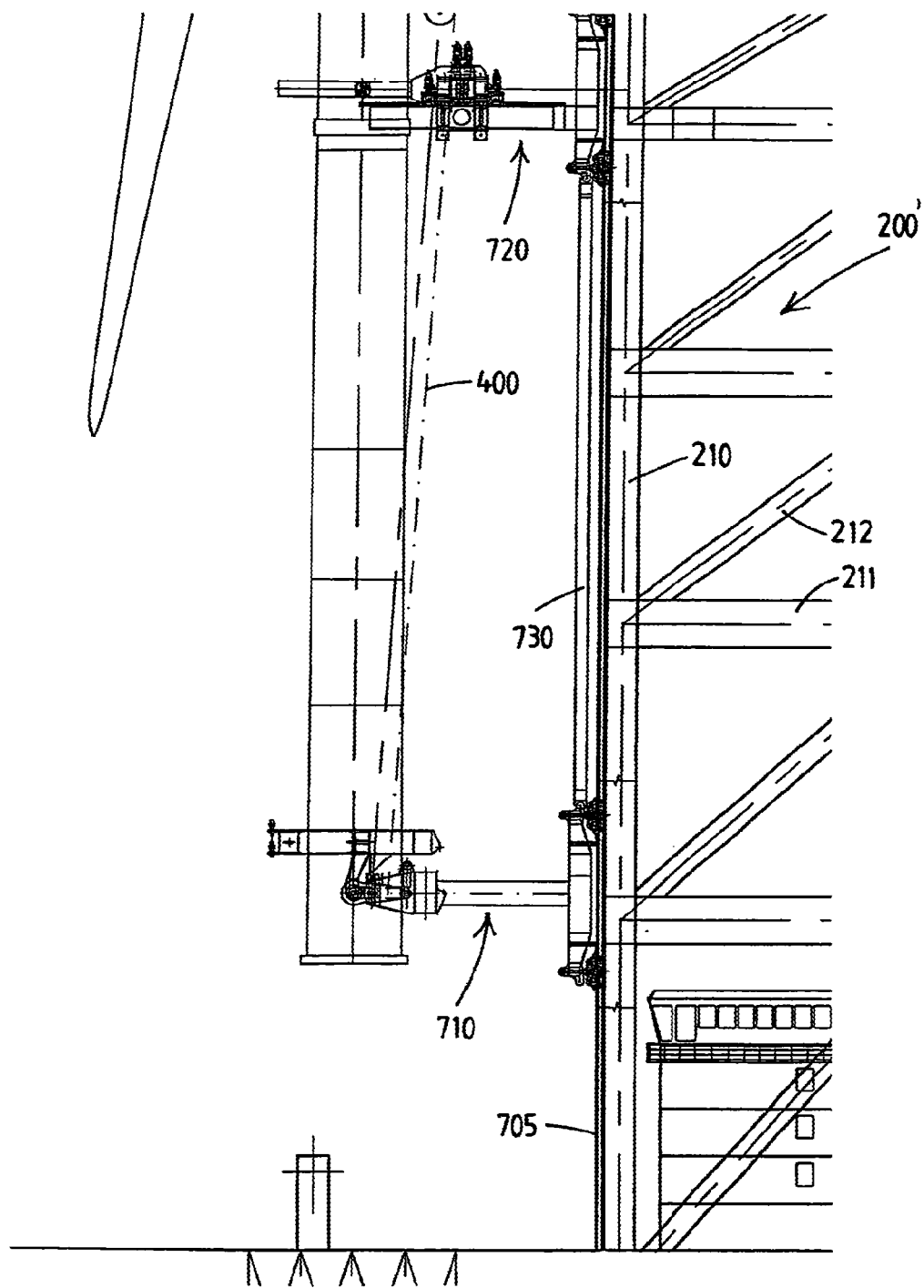
Figure 13:
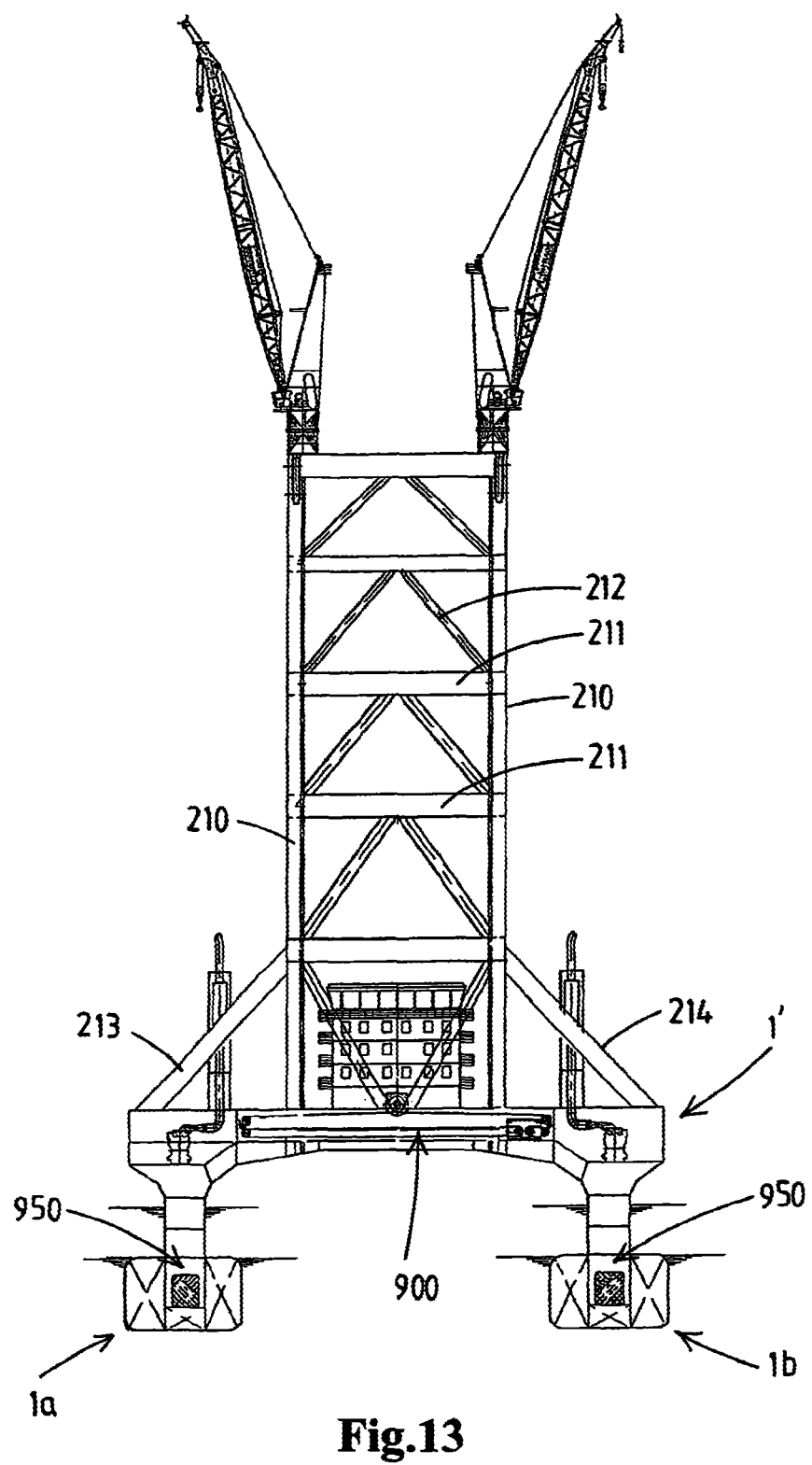
Figure 14:
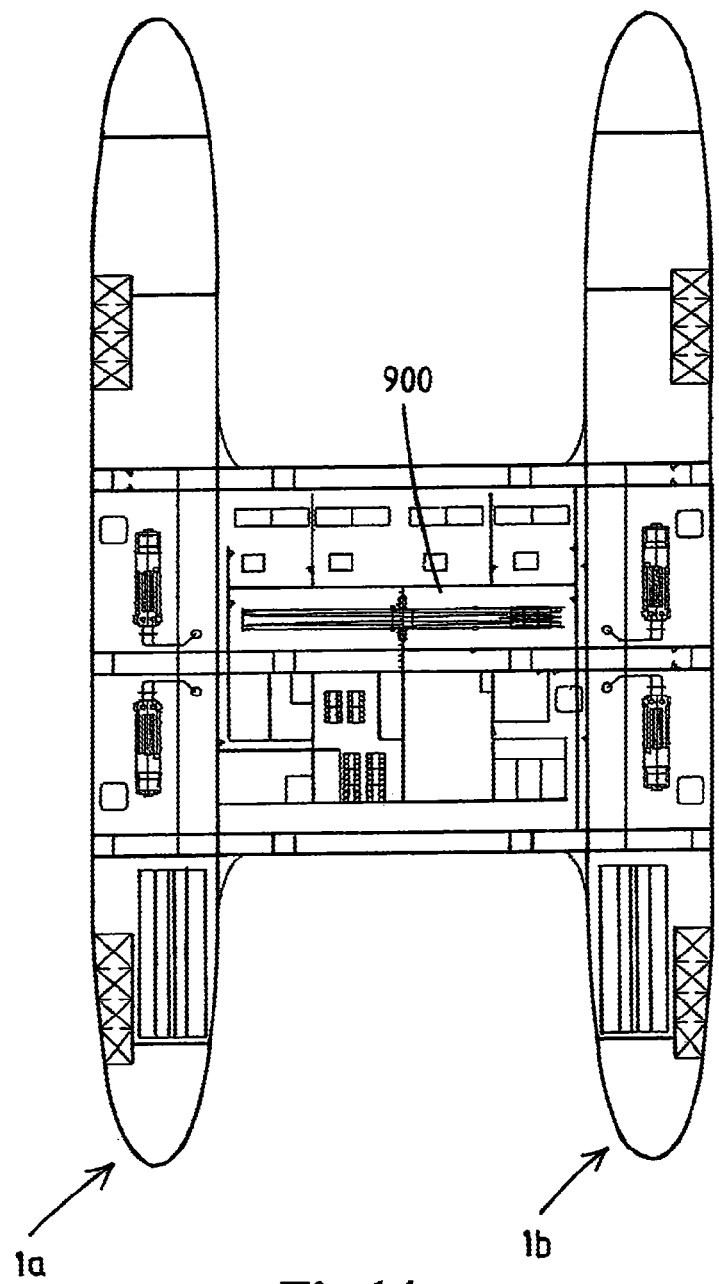
Figure 15:
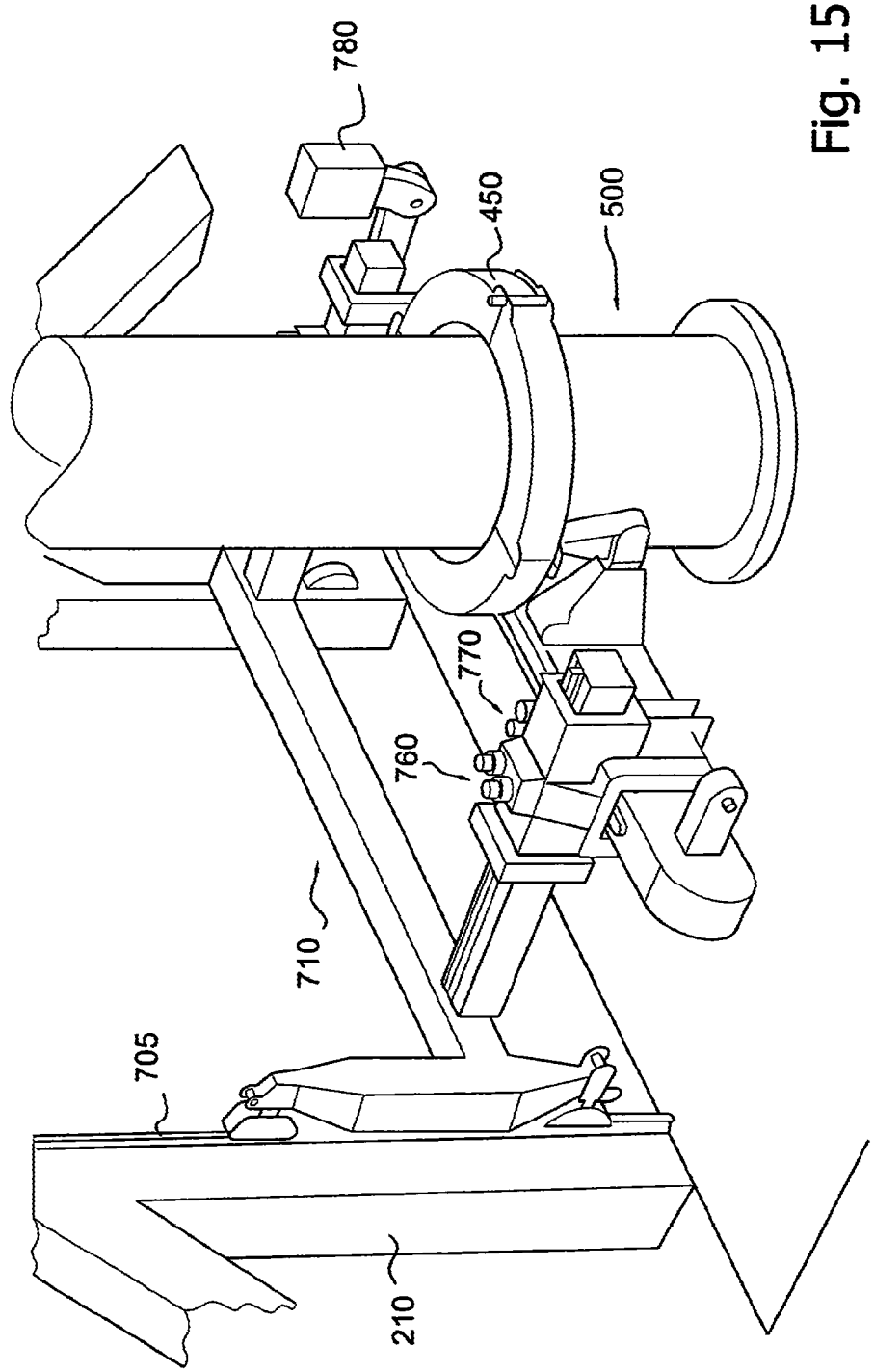
Figure 16:
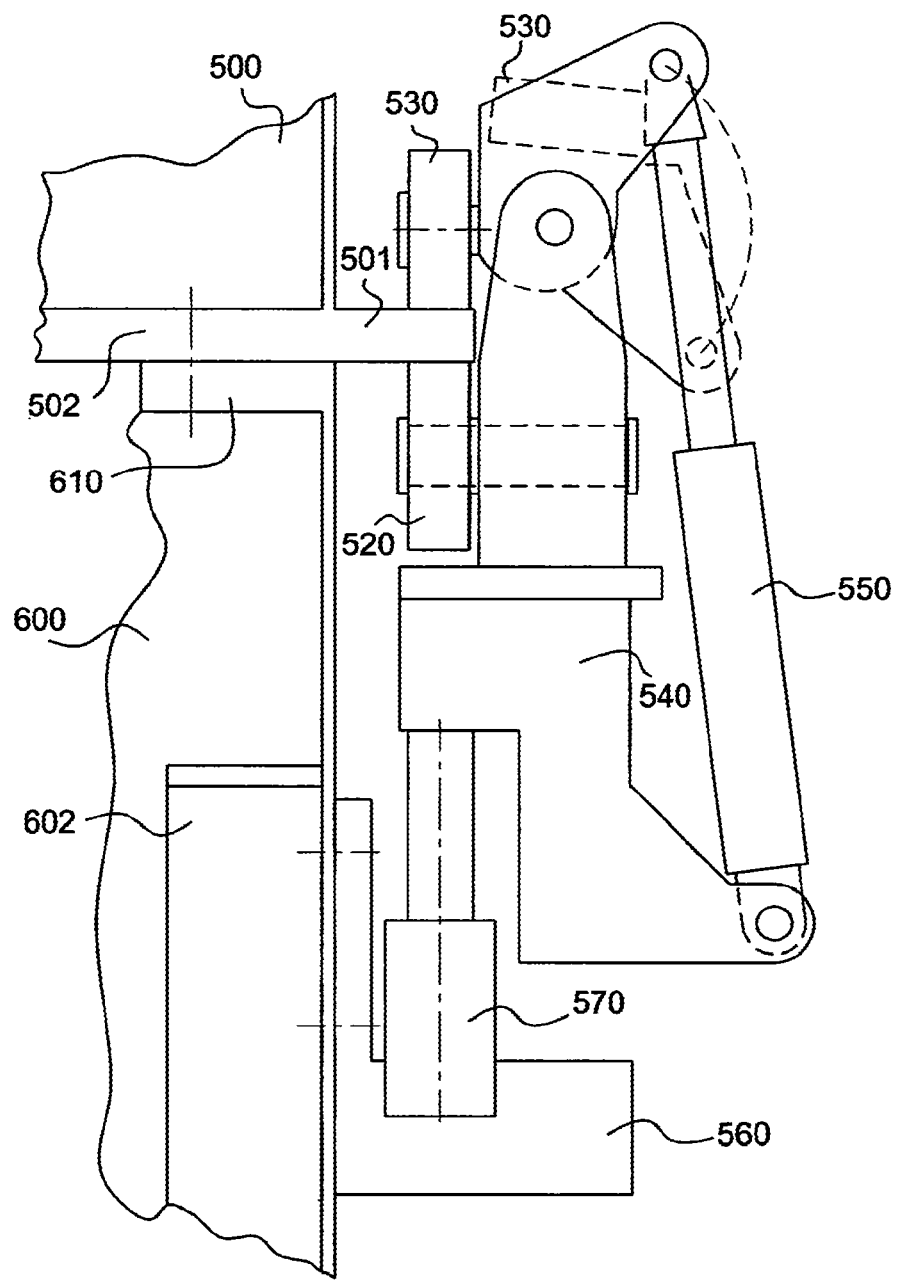

FIG. 11 shows in side view a further embodiment of an offshore wind turbine installation vessel, FIG. 12a shows the vessel of FIG. 11 in longitudinal section, FIG. 12b shows a portion of FIG. 12a on a larger scale, FIG. 13 shows the vessel of FIG. 11 in transversal mid section, FIG. 14 shows a horizontal section of the vessel of FIG. 11, FIG. 15 shows an embodiment of a wind turbine supporting trolley with engagement device, FIG. 16 shows an example of a wind turbine engagement device engaging on a flange on the mast.

With reference to FIGS. 1-5 a first preferred embodiment of an offshore wind turbine installation vessel 1 for installation of an offshore wind turbine 500 will be discussed.

The wind turbine 500 is of the type to be installed on a foundation that is installed on the seabed prior to the installation of the wind turbine on the foundation, which type is known in the art.

FIGS. 1-5 show the foundation 600 embodied as a jacket with a structural framework, the jacket having piling guides 601 through which piles 603 can be hammered to fasten the jacket 600 to the seabed. Other embodiments of foundations, e.g. a monopile or a gravity base, are also possible. As is preferred the top end of the foundation will extend above the water surface.

As is preferred the vessel 1 has a storage for piles 603, preferably in horizontal state, preferably along one or more longitudinal sides of the vessel 1.

As preferred a pile and pile hammer handling crane 605 is provided on the vessel 1, here embodied as a slewable pedestal crane with a boom.

The wind turbine 500 is of the type with a vertical mast 501 to be fitted with its lower end onto the foundation 600, and with a nacelle, wherein the electric generator is housed, and with a hub and blades supported on top of said mast. It will be appreciated that the wind turbine may also be embodied without a nacelle if future developments provide for such wind turbines. Also the blades may be different than shown here.

As is preferred the vessel 1 is embodied to hold and transport said wind turbine 500 in fully assembled, and preferably tested, condition, so that these tasks need not be performed on the offshore location (or to limited extent).

The vessel 1 shown here has a non-jack-up type floating hull, so without jack-up legs and associated jack-up mechanisms. As is preferred it is a self-propelled floating hull, here with one or more dedicated propellers at the stern for sailing with the vessel and multiple thrusters allowing for dynamic positioning, although the use of anchors for positioning the vessel is also an (additional or alternative) option.

As is preferred the vessel 1 has a twin hull design of the SWATH-type with two parallel hull parts 1*a*, 1*b* connected by a central bridge 1*c*. The hull parts are quite similar to a submarine hull. When seen from above the deck of the vessel 1 is in an H-shape forming open spaces, here of a U-shape contour, between the hull parts 1*a*, 1*b*, which spaces are open towards the bow and the stern of the vessel. These spaces serve to lower the wind turbine 500 and the foundation 600, and to be able to move away from the lowered object.

In a possible embodiment hatch covers are associated with the vessel 1 to cover one or both open spaces in the H- or U-shaped deck of the vessel 1, possibly mobile, e.g. folding, hatch covers, or removable (e.g. with a crane 605, or crane 900 in FIG. 10) hatch covers.

In a version wherein the vessel is only employed for transportation and installation of the wind turbine 500, the vessel may have a U-shape when seen from above. Or an H-shaped vessel is used to handle two wind turbines.

On the deck of the vessel 1, here—as is preferred—on the central bridge 1*c* a rigid crane structure 200 is mounted. Also a crew accommodation 300 is mounted on the central bridge.

As is highly preferred the crane structure 200 is embodied as a rigid structural framework, that is rigidly fixed to the hull of the vessel 1. The crane structure 200 extends as a very tall tower above the deck of the vessel. In a practical design the tower may have a height of at least 75 meters above waterline, or even at least 100 meters. As can be seen it is envisaged here that the height of the crane structure is such that the top end, e.g. top suspension members held by said crane structure, is higher than the nacelle of the suspended wind turbine 500.

In general the crane structure 200 is provided with a hoisting device having one or more wind turbine suspension elements 400 and a wind turbine engagement device 450 supported by said one or more suspension elements 400 and adapted to engage with said wind turbine at a height above its centre of gravity G. The hoisting device is adapted to support and to raise and lower in controllable manner the wind turbine 500 while suspended in generally vertical orientation; preferably with the nacelle and preferably also with the hub and blades fitted on top of the mast (as in this embodiment). In practice the weight of such a complete wind turbine 500 may be in the range of 1000 tonnes.

As will be discussed in more detail below the vessel 1—as is preferred—includes an active horizontal motion device adapted to actively compensate for sea-state induced horizontal displacement of the wind turbine engagement device in at least one horizontal direction, possibly in two non-parallel horizontal directions, e.g. in orthogonal horizontal directions, while a wind turbine is suspended in vertical orientation there from.

As is also preferred the hoisting device further comprises a heave compensation device adapted to compensate for sea-state induced vertical displacement of the wind turbine engagement device 450.

In more detail the crane structure 200 has at least one, here two opposed vertical sides, here adjacent each open space in the deck of the vessel, so at the bow and stern side of the structure 200. Along each of these vertical sides a trolley guide 202, 203, e.g. including parallel guide rails, is fitted, preferably at least with the height region where—depending on the height of the wind turbine—the engagement device 450 will operate.

The trolley guides 202, 203 serve to guide an associated trolley 205,206 in vertically mobile manner along the respective side of the structure 200. The trolleys are or identical or similar design, the main features of trolley 250 are shown in more detail in FIGS. 5*a-f*.

The wind turbine hoisting device here includes one or more top suspension members 470 for the suspension elements 450, here above the trolley 205. The suspension elements 400 are connected to the trolley 205 directly and the wind turbine engagement device 450 is supported in turn by the trolley 205.

In this embodiment the top suspension members 470 are arranged at a fixed position on the crane structure 200, here above the trolleys 205.

As is preferred the wind turbine hoisting device comprises one or more hoisting cables 450, wherein the top suspension members are embodied as cable sheave assemblies and wherein preferably one or more further cable sheave assemblies are arranged at the lower end of the hoisting cables 450, so as to arrive at a multiple cable fall arrangement. One or more hoisting winches (not shown here) are mounted on the vessel, e.g. in the crane structure.

In this embodiment the lower cable sheave assemblies 471 are mounted on opposite sides of the trolley, with the mast extending through the trolley 205, here through a laterally opened passage through the trolley 205. In this example the trolley 205 is supported at each side at a single location. In order to absorb torsional forces, as will be explained above, it is envisaged that the trolley 205 is supported at each lateral side by multiple cable fall arrangements 400 each passing through an assembly 471, one closer to the structure 200 than the other. This will be elucidated in more detail with reference to the second preferred embodiment of the vessel shown in FIGS. 7-9. Suitable running of the hoisting cable through the assemblies 471 (and corresponding top assemblies 470) at one side of the trolley may result in a balanced load on the associated winch, largely independent from the position of engagement device 450 with respect to the trolley 205 as will be explained below.

In this embodiment the active horizontal motion device is mounted between the trolley 205 and the wind turbine engagement device 450.

As is preferred the trolley 205 comprises a track 210 in a horizontal direction, here as preferred in longitudinal direction of the vessel, and the wind turbine engagement device 450 is movable along said track while being supported by said track 210.

As depicted schematically here the wind turbine engagement device 450 comprises a hang-off mast clamp 450 adapted to engage on the mast of the wind turbine above the centre of gravity of the suspended wind turbine. The hang-off mast clamp 450 is adapted to support the weight of the suspended wind turbine 500, e.g. the clamp frictionally engaging on the mast or, as preferred, the clamp 450 engaging on a support formation, e.g. a collar, on the mast. So here the clamp 450 is in direct load transferring engagement with the mast, without the use of any intermediate cables.

The hang-off mast clamp here comprises two pivotal clamping arms 450*b,c* as well as a clamping base 450*a*, allowing to open the clamp 450 and fit it around the mast, the end of the arm 450 preferably being interconnected when the clamp engages the mast.

As is preferred the hang off mast clamp is pivotally arranged in a carrier 460 about at least one horizontal pivot axis 461, here the pivot axis 461 extending in transverse direction of the vessel.

Figure 8A:
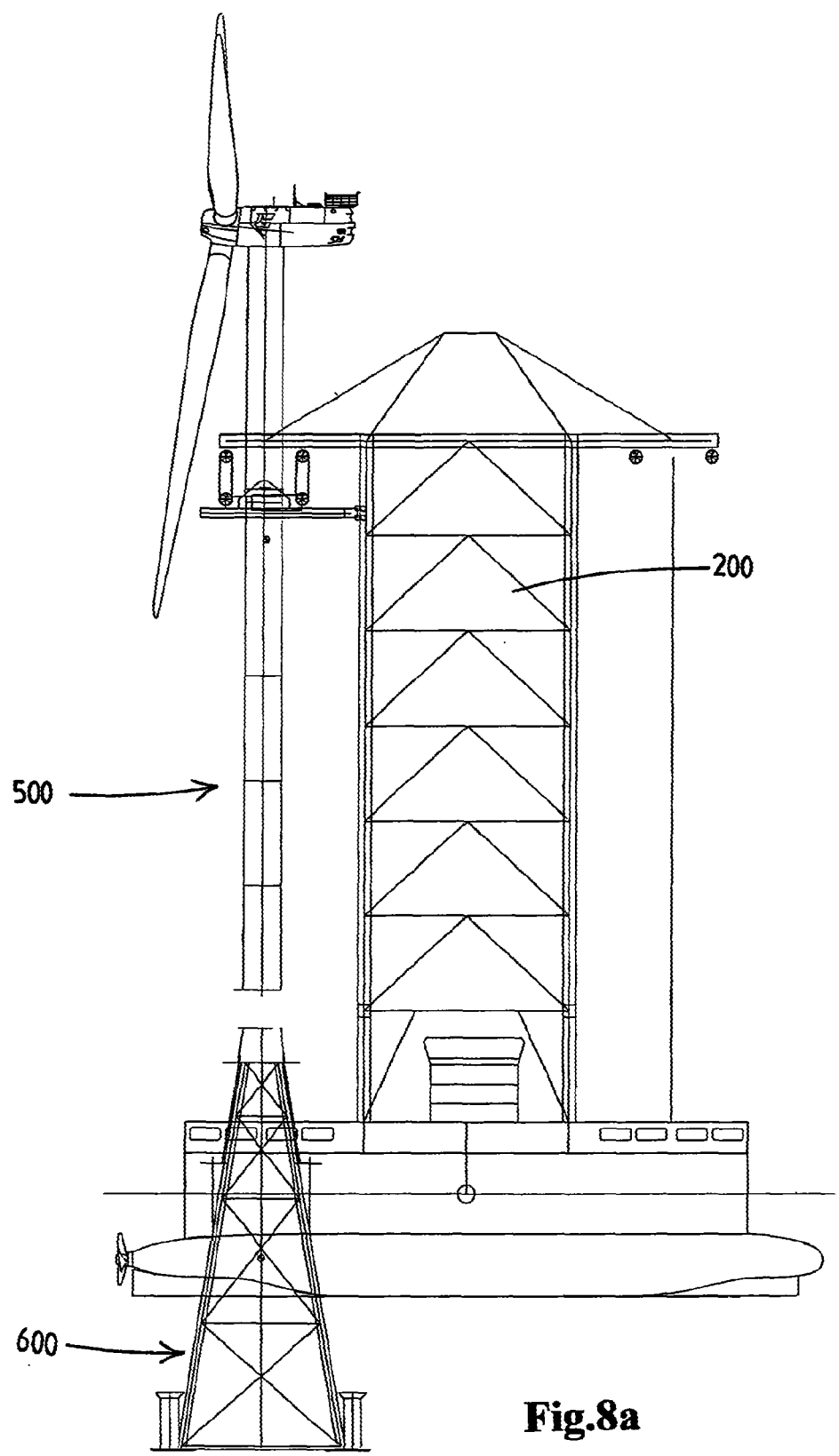
Figure 8B:
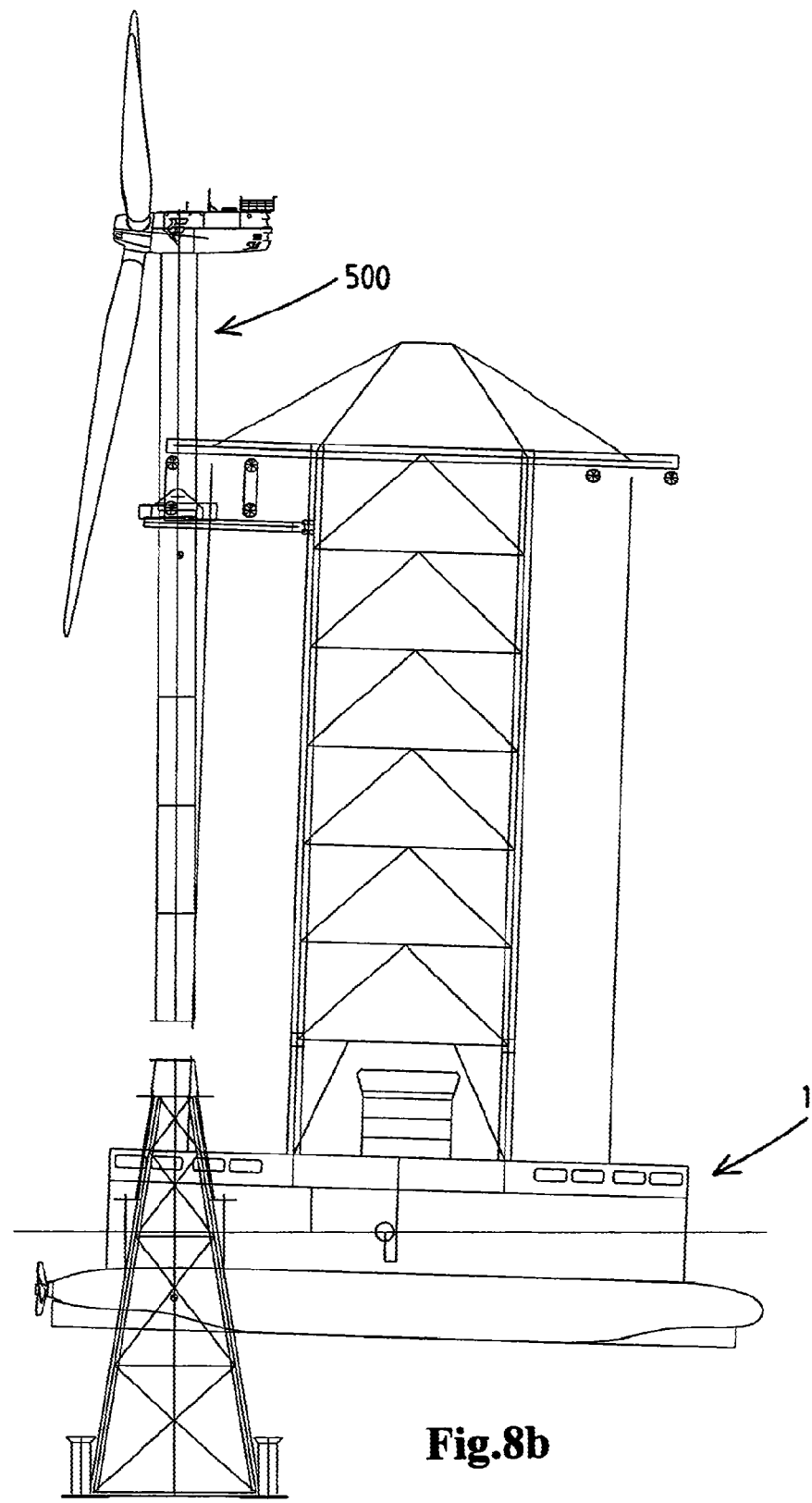
Figure 8C:
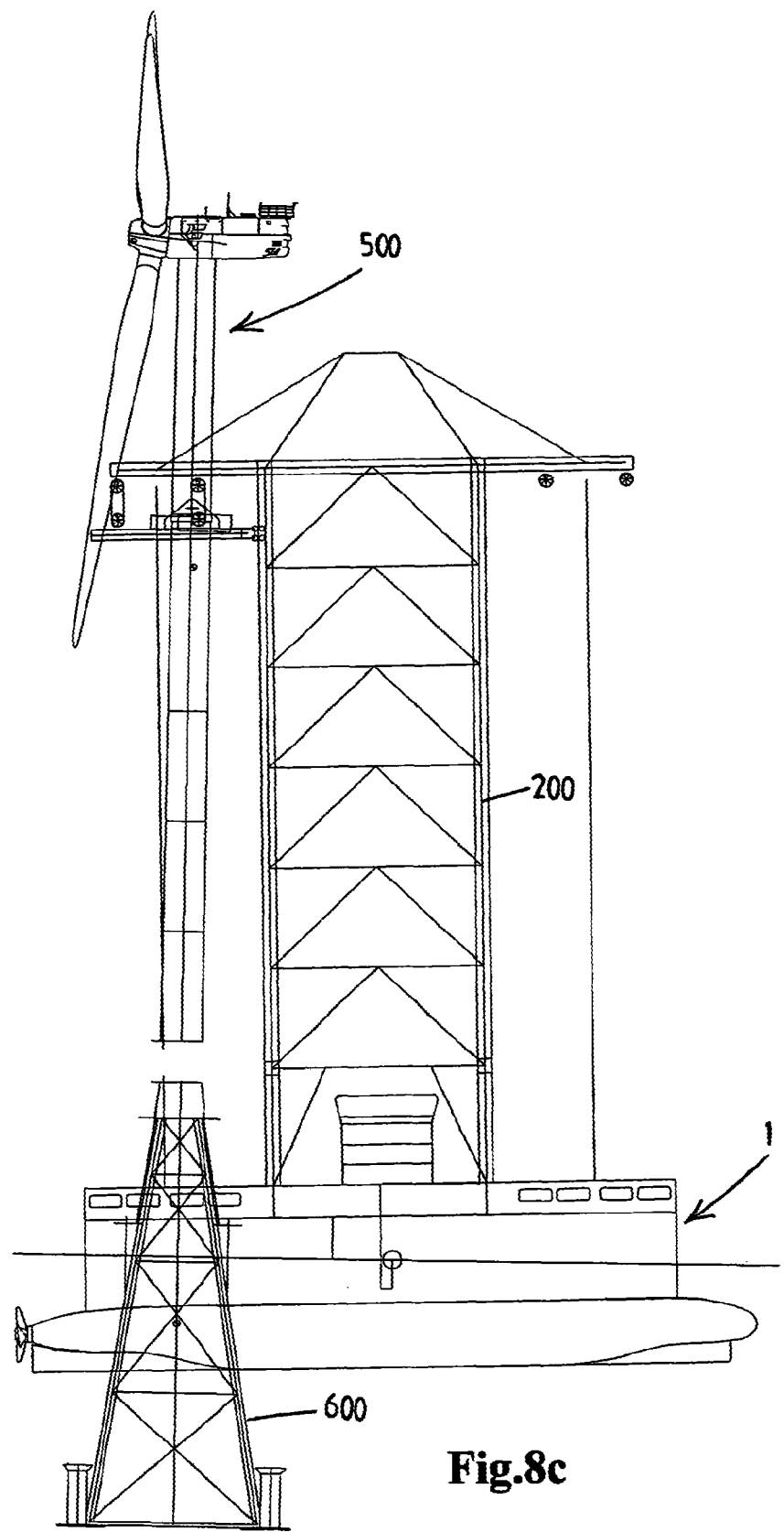

As will be understood the active horizontal motion device is able to perform motions of the clamp 450 with respect to the trolley 205 in longitudinal direction of the vessel 1. These motions are performed such that sea-state induced motions of the vessel, in this example mainly pitch of the vessel, is compensate for such that it can be achieved that the lower end of the mast shows little or no horizontal motion (here in particular in longitudinal direction of the vessel) with respect to a pre-installed seabed foundation. This is illustrated in FIGS. 8*a*-*c* for the second preferred embodiment of the vessel according to the invention. It will be understood that for the vessel 1 the operation and effect of the active horizontal motion device is the same.

Due to the height of the trolley 205 above waterline for the envisaged wind turbines, any pitch motion of the hull translates itself to an even larger, mainly horizontal displacement of the trolley 205. In a practical embodiment the reciprocating motion range of the engagement device 450 with respect to the trolley 205 may be more than 4 meters.

The reciprocating compensation horizontal displacement of the engagement device 450 may be effected in any suitable manner. Most preferably the active horizontal motion device comprises one or more motor powered displacement actuator assemblies, e.g. a hydraulic power assembly including a pump and one or more hydraulic cylinders 480 (as depicted here) or a winch assembly with a horizontal displacement cable arrangement and with a motor powered winch or a rack and pinion device.

It will be appreciated that the active horizontal motion device may include a control device for said displacement actuator assemblies, preferably a computerized electronic control device. One or more sensors, e.g. inclination sensors, may be provided to sense the vessel motion in one or more selected directions and the control device is preferably adapted to calculate the desired horizontal displacements on these basis of such vessel motion measurements. The control device may also include one or more sensors that detect the actual position of the mast, e.g. with reference to the foundation and/or any motion and/or inclination of the mast.

In a wind turbine installation vessel, preferably according to one or more of the aspects discussed herein, equipped with one or more damping devices for roll and/or pitch of the vessel a control device for these one or more damping devices may be provided that relies on measurements of the vessel motion(s) with reference to a stationary reference, e.g. a reference on the pre-installed foundation onto which the wind turbine is to be installed. It can also be envisaged to obtain reference for this vessel motion damping devices control from a reference on another pre-installed foundation, or on multiple pre-installed foundations, or on another installed wind turbine, or on multiple wind turbines that have already been installed, as will be present in a field of wind turbines once the installation process is progressing. As a possible embodiment one can envisage laser distance measurement from an elevated position on the rigid crane structure of the vessel to a reference on a foundation or an already installed wind turbine in the field, or to multiple spatially arranged references. This control of the damping device(s) by use a stationary reference may be in addition to common control devices for these functions on vessels, e.g. including gyroscopes or other sensors for inclination, acceleration, etc.

In a possible embodiment the active horizontal motion device is provided with energy storage means that temporarily store energy, e.g. in the form of an electrical supercapacitor, when appropriate, e.g. due to a retardation in the horizontal motion performed by the motion device and release the stored energy when acceleration is required.

In a less preferred embodiment the active horizontal motion device comprises a horizontal displacement cable arrangement between the crane structure, here the trolley supported by the crane structure, on the one hand and the engagement device on the other hand, wherein the cable arrangement comprises a reference cable adapted to be attached to the seabed foundation, such that vessel motion with respect to the seabed foundation causes active horizontal motion of the engagement device 450.

It will be appreciated that the foundation hoisting device, here including trolley 206, may preferably be similar or identical to the wind turbine hoisting device. This is the case in this example, so that it is possible to handle the wind turbine at either the bow or the stern of the vessel or even to handle two wind turbines at the same time.

For handling the foundation 600 it is envisaged here that the foundation 600 is connected, e.g. via a cable sling or other connector 610, to the trolley 206 and/or the assembly 450, so that the foundation 600 can be raised and lowered by the suspension elements 400 connected to the trolley 206.

As explained before it is expected that a SWATH-design vessel will show limited roll, allowing to dispense with compensation of horizontal motion in transverse direction of the vessel. Obviously, when desired, the engagement device 450 could be arranged on the trolley 205 to be also horizontally movable in said transverse direction, e.g. similar to an X-Y table, in practical design presumably over a smaller range of motion. It will be appreciated that for a hull design showing more roll, such a compensation may be necessary. In order to cope with roll of the vessel, possibly as an alternative to a further horizontal direction of motion of the active horizontal motion device, the vessel may comprise a roll damping device comprises one or more mobile solid ballast bodies guided on a track on the hull, preferably housed within a compartment of the hull of the vessel, and an associated displacement drive and displacement drive control, said drive control being adapted to cause motion of said one or more solid ballast bodies so as to compensate for sea-state induced vessel roll motion. As explained such a roll damping device is known in the art.

Stabilizer fins 870 (see FIG. 10) or similar may also be provided on the vessel 1 to cope with roll of the vessel, e.g. during sailing.

In FIG. 2 the fourth aspect of the invention is schematically indicated. The vessel 1 is provided with multiple positioning pins 615 that are each received in a pile guide 601 of the foundation to maintain the foundation 600 in a predetermined position during transportation of the foundation with the vessel 1.

For transportation of one or monopiles, it is possible to provide the vessel with a monopile storage structure on the lower section of a vertical side of the crane structure, such that the monopile is held in vertical orientation and can be handled by the crane structure mounted hoisting device at said side. In the embodiments shown here it is envisaged that a monopile can be suspended from a trolley 205, 205' or the clamp 450 supported thereby, so that the suspension cables 400 and the associated winch(es) can be used for lifting and lowering. The active horizontal motion device that is provided to perform horizontal compensation motions of the clamp 450 can also be used for horizontal displacement of the monopile away and towards the storage structure.

For maintaining the lower end of the mast in a desired position relative to the vessel during transportation an arrangement of one or more damper cables can be envisaged, that allow for motion of the lower end yet in a dampened manner. An example of such cables 850 is shown in FIG. 10. As an alternative or in combination with such damper cables 850 a centralizer or damper mechanism 860, see FIG. 10, can be provided, e.g. held by the crane structure, the centralizer dampening undue sway motion of the lower section of the mast of the wind turbine.

With reference to side view in FIG. 6 an alternative active horizontal motion device will be explained in more detail.

Here the active horizontal motion device is adapted to perform active horizontal displacement of the one or more suspension elements 400, in particular of the top suspension members 471 from which they depend. In this example the motion is performed in longitudinal direction of the vessel.

Here the active horizontal motion device is mounted between the crane structure 200 and the one or more top suspension members 470.

The one or more top suspension members 470 are mounted on a common mobile carrier 490 and this carrier is supported in a mobile manner with respect to the crane structure. In this example a linkage mechanism including pivotal bars 491 (here about horizontal axis transverse to the vessel) is provided between the structure 200 and the carrier 490.

In this example it is envisaged that one or more hydraulic cylinders 495 are mounted between the crane structure 200 and the carrier 490, which are adapted and controlled to provide controlled horizontal compensating motion of the carrier.

As preferred the suspension elements 400 are embodied as multiple fall hoisting cable 400a which extends towards a winch (not shown).

Compensation of vertical vessel motion is preferably performed with a heave compensating system, here acting on cable 400a, as is known in the art.

In another embodiment, not shown here, the active horizontal motion device comprises at least one horizontal track on the crane structure, as well as one or more carriers supported by said track, each carrier being provided with one or more top suspension members, and wherein the active horizontal motion device further includes a displacement drive and associated displacement drive control adapted to cause motion of said one or more carriers along said track.

In yet another embodiment not shown here the active horizontal motion device comprises a first set of one or more horizontal tracks extending in a first horizontal direction, said first set supporting at least one carrier, and wherein said carrier supports a second set of one or more horizontal tracks extending in a second horizontal direction different from the first direction, e.g. the first and second direction being orthogonal directions, the second set of one or more horizontal tracks supporting one or more further carriers supporting said one or more top suspension members.

In an embodiment not shown here the crane structure is provided with a docking device for the wind turbine engagement device, and wherein the hoisting device is operable to pull the wind turbine engagement device with the suspended wind turbine against the docking device with a pretension.

In FIGS. 7a, b a second preferred embodiment of the wind turbine installation vessel 1 is shown. In the figures parts that are the same or similar as parts discussed with reference to FIGS. 1-5 have been denoted with the same reference numeral. Their function and operation also is the same as discussed herein before.

The main distinction with the first preferred embodiment shown in FIGS. 1-5 is the lay-out of the suspension members 400 and of the trolley 205 which supports the mast engagement device 450 (here embodied as a mast clamp, see FIGS. 9a-c).

Here each lateral side of the trolley 205' is provided with multiple cable sheaves 471, the one closer to the crane structure 200 than the other. Here the trolley 205' is suspended from four multiple fall cable assemblies 400, two at each lateral side of the trolley 205.' Not shown here are hydraulic actuators or other drive means that actively move the mast clamp 450 in longitudinal direction over the trolley 205' to compensate for sea-state induced vessel motion, here in particular pitch of the vessel.

FIGS. 8a-c illustrate the operation and effect of the active horizontal motion device on the position, here primarily in longitudinal direction of the vessel, of the lower end of the mast with respect to the pre-installed foundation 600.

Preferably the vessel 1 is equipped with a water ballast system, possibly a dynamic water ballast system, including one or more ballast tanks, e.g. in both hulls 1a, 1b of the vessel. This e.g. allows to compensate for the moment when the foundation 600 is placed on the seabed, so that the vessel then only supports the wind turbine 500. Also the water ballast system may be used to influence the draught of the vessel, e.g. to influence seagoing properties of the vessel during transportation, and/or to compensation for inclination due to wind forces acting on the tall crane structure 200.

In a possible embodiment the water ballast system is similar to a submarine ballast system, e.g. allowing to empty a ballast tanks quickly by introduction of compressed air. Therefore one or more ballast tanks may be connected to a pressurized air source, e.g. compressed air storage tanks, via a control valve for rapidly passing air into the water ballast tank and thus to rapidly expel water from the tank. Such a system may also be employed in an emergency, e.g. when vessel is listing in an unacceptable manner. In a possible embodiment the control valve is operated on the basis of an automated controller, e.g. a computer, wherein conditions are stored which will result in operation of the ballast system, e.g. based on one or more (inclination) sensors.

With reference to FIGS. 11-14 an embodiment of a wind turbine installation vessel and other aspects of the invention will be elucidated.

The vessel 1' is a twin hull vessel, as is preferred according to the SWATH-design.

The vessel 1' has a rigid crane structure 200' extending upward from said hull, here a rigid structural framework, here with vertical posts 210 in a rectangular or square arrangement, horizontal girders 211 between the posts 210, and diagonal braces 212 in the vertical plane between the posts.

The crane structure 200' is rigidly connected to the hull of the vessel.

The crane structure has a first, here rear, vertical side and a second, here front, vertical side.

At the rear vertical side vertical trolley guides, here vertical guide rails 705 fitted on both vertical posts at the rear of the structure 200', are provided.

At the rear side here two trolleys 710 and 720 are provided, vertically mobile and guided by said trolley guide rails.

The lower trolley 710 here is adapted to support the weight of the wind turbine, whereas the upper trolley 720 primarily serves to maintain the vertical balance and orientation of the wind turbine 500.

The lower trolley 710 is suspended by one or more cables 400 from the crane structure 200'. As explained said cables 400 may be passed around lower sheave assemblies, said sheave assemblies being either fitted to the trolley 710 or directly to the wind turbine engagement device held by said trolley 710.

These cables 400 are connected to one or more winches of the wind turbine hoisting device, having a capacity sufficient to lift the wind turbine 500.

An active horizontal motion device is mounted between the trolley 710 and the wind turbine engagement device, and the active horizontal motion device is adapted to actively compensate for sea-state induced horizontal displacement of the wind turbine engagement device in at least one horizontal direction, possibly in two non-parallel horizontal directions, e.g. in orthogonal horizontal directions, while a wind turbine is supported by said wind turbine engagement device.

The second or upper trolley 720 also supports a wind turbine engagement device, here engaging on the mast as is preferred.

An active horizontal motion device is mounted between the second or upper trolley 720 and the associated wind turbine engagement device, said active horizontal motion device being adapted to actively compensate for sea-state induced horizontal displacement of the wind turbine engagement device in at least one horizontal direction, possibly in two non-parallel horizontal directions, e.g. in orthogonal horizontal directions.

As can be seen the crane allows to engage the mast of the wind turbine 500 with said wind turbine engagement devices of trolleys 710, 720 at vertically spaced apart positions so as to support the mast in vertical orientation, the one engagement device primarily supporting the weight of the wind turbine the other engagement device primarily serving to stabilize the wind turbine in vertical orientation.

As is preferred the crane allows to engage the mast with said wind turbine engagement devices at positions that are at least 20 meters apart in vertical direction, preferably at least 30 meters, here about 40 meters.

One or more connecting rods 730 are provided that are adapted to directly interconnect the wind turbine supporting trolley 710 and the second or upper trolley 720 at said first vertical side so that a vertical spacing is maintained between said trolleys and the upper trolley 720 follows the vertical motion of the lower trolley. If desired the one or more connecting rods may be of adjustable length.

In this embodiment the front side of the crane structure 200' is shown to carry a foundation 600 to be placed on the seabed. The front side may however, as is preferred, also be used to carry a further wind turbine 500.

In this example the foundation hoisting device is similar to the wind turbine hoisting device, with an upper trolley 750 and a lower trolley 740, preferably of similar design as for the wind turbine. A transition or other connector assembly may be provided to suspend the foundation from the hoisted foundation trolley 740. As shown the upper trolley is not used here for supporting the foundation. It is envisaged that for the upper trolley 750 (as well as for upper trolley 720) there is a parking position at an elevated position (here shown for trolley 750) where the trolley is locked with respect to the crane structure, e.g. by operable locking pins.

The vessel 1' is a twin hull vessel with two parallel hulls connected by a central bridge or cross-structure so as to form a generally H-shape deck forming open spaces between the hulls towards the bow and the stern of the vessel. The rigid crane structure 200' is located above the central bridge, and the crew accommodation and bridge are being mounted on the central bridge.

The vessel 1' has a roll damping device 900 comprising one or more mobile solid ballast bodies guided on a track on the hull, here as is preferred a straight track transverse on the vessel. As is preferred the one or more solid ballast bodies are displaceable in transverse direction of the hull over at least 10 meters, here about 40 meters.

The device 900 is housed within a compartment of the hull of the vessel, here within the central bridge of the hull. As explained the device 900 includes a displacement drive and displacement drive control, said drive control being adapted to cause motion of said one or more solid ballast bodies so as to compensate for sea-state induced vessel roll motion. As shown in FIG. 13 the preferred embodiment includes a winch displacement drive and cables attached at either end of the carriage with solid ballast bodies, the winch being operated to move the ballast in reciprocal manner to dampen roll motion of the vessel.

As can be recognized in FIG. 12 the vessel 1' also has a pitch damping device 950 in each hull part 1a, 1b. Each damping device 950 comprises one or more mobile solid ballast bodies guided on a track, here as is preferred a straight track extending in longitudinal direction of the hull part. As explained a displacement drive and displacement drive control are provided, said drive control being adapted to cause motion of said one or more solid ballast bodies so as to compensate for sea-state induced vessel pitch motion.

As is preferred the damping devices 950 are mounted at a low position in each hull part 1a, 1b.

As is preferred in each pitch damping device 950 the one or more mobile solid ballast bodies are displaceable in longitudinal direction of the hull over at least 20 meters, preferably between 40 and 80 meters.

As explained the vessel 1' has hulls 1a, 1b of the SWATH-type having a submarine form lower hull portion and one or more streamlined struts on top of said hull portion, said one or more struts extending through the water surface, the upper ends of the one or more struts connecting to the bridge part or cross-structure.

FIG. 11 shows the vessel 1' when installing a wind turbine 500 on a pre-installed seabed foundation 600.

The method includes—with the hull of the vessel in floating condition—holding the wind turbine 500, at least the mast thereof, in vertical orientation with the wind turbine hoisting device and positioning the lower end of the mast of the wind turbine above the pre-installed foundation 600.

The method further includes—with the lower end of the mast being positioned above the pre-installed foundation—at least during the steps of lowering the mast onto the foundation and fastening the mast to the foundation, operating the one or more active horizontal motion devices so as to compensate for sea-state induced horizontal motion of the wind turbine engagement device.

When present, as is preferred, the method then further includes—with the lower end of the mast being positioned above the pre-installed foundation—at least during the steps of lowering the mast onto the foundation and fastening the mast to the foundation, operating a heave compensation device associated with the wind turbine hoisting device so as to compensate for sea-state induced vertical motion of the lower end of the mast relative to the pre-installed foundation.

As preferred the vessel 1' is stabilized by suitable operation of the damping devices 900 and 950 at least during the steps of lowering the mast onto the foundation and fastening the mast to the foundation, preferably also preceding said steps, e.g. when positioning said vessel near the pre-installed foundation.

An aspect of the invention present in the vessel 1' is that the framework of the rigid crane structure 200' is embodied to form a load-bearing structure absorbing sea-state induced forces complementary to the cross-structure or bridge part of the vessel 1'.

In this preferred embodiment the rigid structural framework comprises two parallel rows of multiple vertical posts 210 arranged on the cross-structure, each row being spaced from the outer side of the adjacent hull 1a, 1b, horizontal girders 211 between the posts 210 in axial and transversal direction, one or more diagonal braces 212 in vertical planes between the posts, and one or more diagonal braces 213, 214 between each hull part 1a, 1b and a vertical posts 210 or a girder between said posts.

It can be appreciated from FIG. 13 that in particular the presence of the diagonal braces 213, 214 with the interpositioned horizontal girder, contributes to the overall strength of the vessel as it forms a sort of load bearing arc above the cross-structure of the hull, here spanning over the crew accommodation.

FIG. 15 illustrates an embodiment of a wind turbine supporting trolley with a mast engaging clamp 450 or other mast engaging device that is actively movable in two orthogonal directions with respect to the frame of the trolley. The drives 760, 770 to perform these motions here include a toothed rack and one or more motors (e.g. hydraulic or electric) driving a pinion meshing with said toothed rack.

A cable sheave assembly 780 is shown, the one at the other side of the mast left out for clarity), along which the suspension cables are passed at said side of the mast.

FIG. 16 shows in cross-section, schematically, the use of an embodiment of a wind turbine installation tool, in this view while it is engaging on the lower flange 501 of the mast 500 of the wind turbine. The mast rests on the top portion of the foundation 600 and is held by the tool thereon as a temporary fastening of the mast. Only a portion of the mast and the foundation is shown here.

The mast is provided with a circumferential flange 501 on its exterior. This flange 501 is protruding outwardly and may be fitted at the lower end of the mast, as is preferred. The flange 501 has a strength such that the mast can be held upright solely by the tool fitted on the foundation engaging on the flange 501.

In general it is envisaged that the tool allows to fasten the mast (preferably the entire pre-assembled wind turbine) on a pre-installed foundation temporarily, preferably without the use of any other means for maintaining the mast in vertical position. While the tool holds the wind turbine, installation crew members provide for a permanent fastening of the mast to the foundation, e.g. using connector bolts. As the permanent fastening is completed, it is envisaged that the tool is removed for use in the installation of another wind turbine. The tool e.g. allows to sail away with the installation vessel from this particular installation site, e.g. to sail back to shore to pick up another wind turbine and/or foundation, while the permanent fastening still has to be made.

In this example the foundation 600 has a top flange 610 internally of the outer tubular top portion of the mast. The mast 500 also has an internal lower flange 502, these flanges 610 and 502 being provided with bolt holes, so that the mast can be permanently fastened to the foundation via connector bolts that can be installed from within the foundation and the mast.

In general it is envisaged that the tool has an annular frame, preferably composed from one or more segments, allowing to place the tool around the top end of a foundation (and to receive the lower end of the mast) and allowing to remove the tool after the mast of the wind turbine has been fastened permanently to the foundation. For example the annular frame is composed to two semi-circular segments.

E.g. the tool is designed to be connected to the foundation via removable pins or fastening bolts.

As is preferred, it is envisaged that bolt holes for a permanent connection of the mast to the foundation are present in the interior of the mast, e.g. in an internal flange of the mast, so that installation crew members may enter into the mast to provide for the permanent connection with connector bolts.

The embodiment of the tool in FIG. 16 is such that the tool allows for rotation of the mast about its longitudinal axis while the mast is temporary held by the tool with respect to the foundation. This e.g. allows to align the bolt holes of the mast and the foundation.

Here, as preferred, the tool comprises a set of lower rollers 520 engaging the flange 501 of the mast from below and a set of upper rollers 530 engaging said the flange 501 from above. As is preferred a large number of rollers 520 and 530 are distributed around the circumference of the mast to engage at spaced intervals on the flange 501.

As is preferred the rollers 520 have a rotation axis radially to the centre of the tool, the axes lying in a plane corresponding to the plane of the lower side of the flange 501, here a horizontal plane as is preferred. As is preferred an upper roller 530 is present for each lower roller 520.

In this example each pair of a lower roller 520 and an upper roller 530 is held in an associated subframe 540 of the tool.

Each upper roller 530 is displaceable between a retracted position (roller 530 in dashed lines) and an active position engaging on the flange 501. One or more actuators, here a hydraulic jack 550, is associated with the upper roller 530 so that said flange 501 can be forcibly clamped between the lower and upper rollers 520, 530. The clamping is such that it allows to hold the entire wind turbine.

As is preferred side rollers may be provide engaging on the outside of the flange while the flange is resting on the lower set of rollers.

As is preferred one or more vertical displacement actuators are associated with the frame of the tool, allowing to displace at least the lower set of rollers while supporting the weight of the wind turbine.

In a possible embodiment the frame of the tool comprises a base frame part to be stationary secured to the foundation, a mobile frame supporting the sets of rollers and actuators for the upper rollers, and said one or more vertical displacement actuators being arranged between said base frame and said mobile frame.

In this example, the tool has a frame 560 that is to be stationary secured to the foundation 600. In this example the foundation 600 is provided with reinforcement members 602, preferably internally, allowing to connect the frame 560 to the outside of the foundation, e.g. via connector bolts or otherwise.

The subframe 540 is supported on said frame 560 via an associated vertical displacement actuator 570, allowing to adjust the position of subframe 540 and thus the pair of rollers 520, 530. As is preferred the actuator 570 is a hydraulic jack. Preferably the hydraulic lines of multiple or all jack 570 are arranged in parallel so as to obtain an automatic equalization of hydraulic pressure in the jacks 570 and an automatic adjustment of the position of the groups of rollers to the flange 501 on the mast.

It is envisaged that in a preferred embodiment the one or more jacks 570 are connected to a hydraulic system including one or more gas accumulators with adjustable gas pressure allowing to set an adjustable pressure in the jacks and providing a sort of resiliency in the support for the flange 501 provided by the lower rollers 520. This e.g. allows to absorb any impact from the mast on the lower rollers upon mating the mast with the tool.

It is noted that the structure of the tool described here, e.g. the provision of a set of lower rollers and mobile upper rollers, may also be incorporated in a wind turbine engagement device, e.g. in a clamp as discussed herein, to engage on a dedicated flange on the mast, e.g. at a level above the lower end of the mast. Other features of the tool may then—if desired—also be incorporated in the wind turbine engagement device.

The invention claimed is:

1. An offshore wind turbine installation vessel for installation of an offshore wind turbine, wherein the wind turbine comprising:
 a vertical mast to be fitted with its lower end onto a foundation, and
 a nacelle with a hub and blades supported on top of said mast,
 the vessel comprising:
 a floating hull; and
 a crane structure extending upward from said hull,
 wherein the crane structure is provided with a wind turbine hoisting device having one or more wind turbine suspension elements and a wind turbine engagement device supported by said one or more suspension elements,
 wherein said wind turbine engagement device is adapted to engage with the mast of said wind turbine, said wind turbine hoisting device being adapted to support and to raise and
 lower in controllable manner at least the mast of the wind turbine while in vertical orientation;
 wherein the vessel includes an active horizontal motion device adapted to actively compensate for sea-state induced horizontal displacement of said wind turbine engagement device in at least one horizontal direction, while the vertically oriented mast of the wind turbine is engaged by said wind turbine engagement device, wherein the active horizontal motion device comprises an actuator attached to the vessel.

2. The vessel according to claim 1, wherein the crane structure is a rigid crane structure extending upward from said hull, which crane structure is rigidly connected to the hull of the vessel,
 wherein said crane structure has at least a first vertical side,
 wherein said first vertical side is provided with a trolley guide,
 wherein said crane comprises a wind turbine supporting trolley which is vertically mobile along said trolley guide on the first vertical side of the crane structure,
 wherein said trolley is supported by said one or more suspension elements,
 wherein said trolley supports the wind turbine engagement device, and wherein said trolley and the wind turbine engagement device are adapted to support the weight of the wind turbine, and
 wherein the active horizontal motion device is mounted between said trolley and the wind turbine engagement device, said active horizontal motion device being adapted to actively compensate for sea-state induced horizontal displacement of the wind turbine engagement device in at least one horizontal direction, while a wind turbine is supported by said wind turbine engagement device.

3. The vessel according to claim 2, wherein at said first vertical side of the crane structure—in addition to the wind turbine supporting trolley—a second trolley is provided which is vertically mobile along a trolley guide on said first vertical side of the crane structure,
 wherein said second trolley supports a second wind turbine engagement device,
 wherein the active horizontal motion device is mounted between the second trolley and the associated wind turbine engagement device, said active horizontal motion device being adapted to actively compensate for sea-state induced horizontal displacement of the wind turbine engagement device in at least one horizontal direction,
 wherein said crane allows the mast of the wind turbine to engage with said wind turbine engagement devices at vertically spaced apart positions so as to support the mast in vertical orientation, the one engagement device primarily supporting the weight of the wind turbine the other engagement device primarily serving to stabilize the wind turbine in vertical orientation, and
 wherein said crane allows the mast to engage with said wind turbine engagement devices at positions that are at least 20 meters apart in vertical direction.

4. The vessel according to claim 3, wherein one more connecting rods are provided that are adapted to directly interconnect the wind turbine supporting trolley and the second trolley at said first vertical side so that a vertical spacing is maintained between said trolleys.

5. The vessel according to claim 2, wherein the crane further comprises a foundation hoisting device associated with a second vertical side of said crane structure, opposite from the first vertical side, which foundation hoisting device allows to support as well as raise and lower in a controllable manner the foundation suspended there along the second vertical side of the crane structure.

6. The vessel according to claim 5, wherein the foundation hoisting device comprises a foundation support trolley that is vertically mobile along a trolley guide at said second side of the crane structure,
 wherein said foundation support trolley is supported by one or more suspension members of said foundation hoisting device, and
 wherein a foundation suspension member is provided for connecting the foundation to the foundation support trolley, such that the foundation can be lifted and/or lowered by operation of the foundation hoisting device.

7. The vessel according to claim 1, wherein the vessel is a twin hull vessel with two parallel hulls connected by a central bridge so as to form a generally H-shape deck forming open spaces between the hulls towards the bow and the stern of the vessel, and
 wherein the rigid crane structure is located above the central bridge.

8. The vessel according to claim 7, wherein the vessel further comprises a roll damping device comprising one or more mobile solid ballast bodies guided on a track on the hull, and an associated displacement drive and displacement drive control, said drive control being adapted to cause motion of said one or more solid ballast bodies so as to compensate for sea-state induced vessel roll motion.

9. The vessel according to claim 7, wherein the vessel further comprising at least one pitch damping device comprising one or more mobile solid ballast bodies guided on a track and an associated displacement drive and displacement drive control, said drive control being adapted to cause motion of said one or more solid ballast bodies so as to compensate for sea-state induced vessel pitch motion, the pitch damping device being associated with each parallel hull.

10. The vessel according to claim 1, wherein the crane structure is provided with one or more top cable sheave assemblies at said first said,
- wherein the wind turbine supporting trolley and/or the associated wind turbine engagement device is provided with one or more lower cable sheave assemblies, and
- wherein the suspension elements are one or more cables guided over said cable sheave assemblies, the wind turbine hoisting device comprising one or more winches for said one or more cables.

11. The vessel according to claim 1, wherein the wind turbine hoisting device comprises a heave compensation device adapted to compensate for sea-state induced vertical displacement of the wind turbine engagement device supporting the weight of the wind turbine.

12. The method for installation of an offshore wind turbine, at least the mast thereof, on a pre-installed seabed foundation, wherein the wind turbine is of the type having a vertical mast to be fitted with its lower end onto the foundation, and with a nacelle with a hub and blades supported on top of said mast, said method comprising the steps of:
- using the offshore wind turbine installation vessel according to claim 1;
- with the hull of the vessel in floating condition—holding the wind turbine, at least the mast thereof, in vertical orientation with the wind turbine hoisting device;
- positioning the lower end of the mast of the wind turbine above the pre-installed foundation; and
- with the lower end of the mast being positioned above the pre-installed foundation—at least during the steps of lowering the mast onto the foundation and fastening the mast to the foundation, operating the one or more active horizontal motion devices so as to compensate for sea-state induced horizontal motion of the wind turbine engagement device,
- wherein the wind turbine hoisting device comprises a heave compensation device adapted to compensate for sea-state induced vertical displacement of the wind turbine engagement device supporting the weight of the wind turbine, and
- wherein the method further includes—with the lower end of the mast being positioned above the pre-installed foundation—at least during the steps of lowering the mast onto the foundation and fastening the mast to the foundation, operating the heave compensation device so as to compensate for sea-state induced vertical motion of the lower end of the mast relative to the pre-installed foundation.

13. The method according to claim 12, wherein the vessel is a twin hull vessel with two parallel hulls connected by a central bridge so as to form a generally H-shape deck forming open spaces between the hulls towards the bow and the stern of the vessel,
- wherein the rigid crane structure is located above the central bridge, preferably crew accommodation being mounted on the central bridge,
- wherein—at least during the steps of lowering the mast onto the foundation and fastening the mast to the foundation—the vessel is facing the waves with its bow or its stern, and
- wherein the active horizontal motion device performs active horizontal displacement of the one or more wind turbine engagement assemblies at least in longitudinal direction of the vessel.

14. The method according to claim 12, wherein the vessel further comprises a roll damping device comprises one or more mobile solid ballast bodies guided on a track on the hull, preferably housed within a compartment of the hull of the vessel, preferably within the central bridge of the hull, and an associated displacement drive and displacement drive control, said drive control being adapted to cause motion of said one or more solid ballast bodies so as to compensate for sea-state induced vessel roll motion, and
- wherein—at least during the steps of lowering the mast onto the foundation and fastening the mast to the foundation—the roll damping device and/or one or more pitch damping devices are operated to compensate for sea-state induced vessel motion.

15. In combination, a vessel according to claim 1 and a wind turbine supported by the wind turbine hoisting device in vertical orientation along a first side of the crane structure.

16. An offshore wind turbine installation vessel for installation of an offshore wind turbine, the wind turbine comprising:
- a vertical mast to be fitted with its lower end onto a foundation, and with a nacelle with a hub and blades supported on top of said mast,
- the vessel comprising:
- a floating hull; and
- a crane structure extending upward from said hull;
- wherein the crane structure comprises:
- a wind turbine hoisting device having one or more wind turbine suspension elements attached to and extending downwardly from the crane structure and
- a wind turbine engagement device supported by said one or more suspension elements and adapted to engage with said wind turbine, said hoisting device being adapted to support and
- to raise and lower at least the mast of the wind turbine while in vertical orientation;
- wherein the vessel has single rigid crane structure, the wind turbine hoisting device being arranged to hold the wind turbine, suspended along a first vertical side of the crane structure, a foundation hoisting device also being provided that allows to support as well as raise and lower in a controllable manner the foundation suspended there from along an opposed second vertical side of the crane structure.

17. The vessel according to claim 16, wherein the vessel is a twin hull vessel with two parallel hulls connected by a central bridge so as to form a generally H-shape deck forming open spaces between the hulls towards the bow and the stern of the vessel, and
- wherein the rigid crane structure is located above the central bridge.

18. A twin hull vessel comprising:
- two parallel buoyant hulls interconnected by a hull cross-structure above the waterline;
- a roll damping device comprising one or more mobile solid ballast bodies guided on a track, and an associated displacement drive and displacement drive control, said drive control being adapted to cause motion of said one or more solid ballast bodies so as to compensate for sea-state induced vessel roll motion,
- at least one pitch damping device comprising one or more mobile solid ballast bodies guided on a track and an associated displacement drive and displacement drive control, said drive control being adapted to cause motion of said one or more solid ballast bodies so as to compensate for sea-state induced vessel pitch motion.

19. The vessel according to claim 18, wherein in said roll damping device the one or more solid ballast bodies are displaceable in transverse direction of the hull over at least 10 meters.

20. The vessel according to claim 18, wherein in each pitch damping device the one or more mobile solid ballast bodies are displaceable in longitudinal direction of the hull over at least 20 meters.

21. The vessel according to claim 18, wherein each parallel hull is SWATH, having a submarine form lower hull portion and one or more streamlined struts on top of said hull portion, said one or more struts extending through the water surface, the upper ends of the one or more struts connecting to the cross-structure.

22. The vessel according to claim 18, wherein the vessel is a crane vessel and has a rigid crane structure erected on said cross-structure of the vessel.

23. An offshore wind turbine installation tool for installation of an offshore wind turbine on a foundation that is installed on the seabed prior to the installation of the wind turbine on the foundation, the wind turbine comprising a vertical mast to be fitted with its lower end onto the foundation, wherein the tool is adapted to be fastened to the foundation prior to mating the mast of the wind turbine with the foundation, wherein the mast is provided with a circumferential flange on its exterior, said flange being adapted to be engaged by the wind turbine installation tool, the tool providing a temporary fastening of the mast to the foundation allowing to effect permanent fastening of the mast to the foundation, wherein the tool is adapted to allow for rotation of the mast about its longitudinal axis while the mast is temporary fastened to the foundation with the tool, and wherein the tool comprises a set of lower rollers engaging the flange of the mast from below and a set of upper rollers engaging said the flange from above.

24. The tool according to claim 23, wherein each upper roller is displaceable between a retracted position and an active position engaging on the flange, and wherein one or more actuators, are associated with the upper rollers so that said flange can be forcibly clamped between the lower and upper rollers.

25. The tool according to claim 23, wherein the tool comprises vertical displacement actuators, allowing to vertically position at least the lower set of rollers while the mast is temporary fastening by the tool.

26. A method for installation and/or transportation of a wind turbine and/or a wind turbine foundation, comprising the step of using a vessel according to claim 23.

27. The vessel according to claim 1, wherein the actuator is a hydraulic cylinder.

28. The vessel according to claim 1, further comprising:
sensors for detecting vessel motion; and
a control device to calculate the horizontal displacement from signals received from the sensors,
wherein the control device controls movement of the actuators.

* * * * *